United States Patent

Bosshart

[11] Patent Number: 5,905,680
[45] Date of Patent: May 18, 1999

[54] SELF-TIMED COMPARISON CIRCUITS AND SYSTEMS

[75] Inventor: Patrick W. Bosshart, Plano, Tex.

[73] Assignee: Texas Instruments Incorporated, Dallas, Tex.

[21] Appl. No.: 08/846,377

[22] Filed: Apr. 30, 1997

[51] Int. Cl.[6] .................................................. G11C 7/00
[52] U.S. Cl. ..................................... 365/189.07; 365/194
[58] Field of Search .............................. 365/194, 230.03, 365/189.07; 395/455

[56] References Cited

U.S. PATENT DOCUMENTS

| | | | |
|---|---|---|---|
| 5,479,641 | 12/1995 | Nadir et al. ............................. | 395/455 |
| 5,526,503 | 6/1996 | Kim ......................................... | 395/413 |
| 5,528,541 | 6/1996 | Ghia et al. ........................... | 365/189.07 |
| 5,577,223 | 11/1996 | Tanoi et al. ......................... | 365/230.03 |
| 5,661,694 | 8/1997 | Fukutani et al. ........................ | 365/194 |

*Primary Examiner*—David Nelms
*Assistant Examiner*—Michael T. Tran
*Attorney, Agent, or Firm*—Robert D. Marshall, Jr.; James C. Kesterson; Richard L. Donaldson

[57] ABSTRACT

In one embodiment there is a comparison circuit (28) for selecting data in response to a first binary quantity (ADDRESS) and a second binary quantity (TAG). The comparison circuit includes a match circuit (34) for outputting a match signal (MATCH) in response to comparing the first binary quantity and the second binary quantity. The comparison circuit also includes a delay circuit (36) for outputting a delay signal ($TC_D$) in response to a signal generated at a same time as the second binary quantity, and circuitry (38) for outputting a hit signal in response to the match signal and the delay signal. The hit signal indicates that a memory stores data corresponding to the second binary quantity. Still further, the comparison circuit includes dynamic select circuit (40) for outputting a logic state of data corresponding to the first binary quantity and in response to the hit signal. The dynamic select circuit comprises a precharge node (88) and at least one transistor (90) coupled in a discharge path coupled to the precharge node. The at least one transistor is operable to conduct in response to the hit signal reaching a discharge enable voltage such that the precharge node is discharged and the logic state of the data changes in response thereto. The hit signal has various attributes. First, the hit signal is initially at a disable level insufficient to discharge the precharge node of the select circuit. Second, the hit signal transitions from the disable level to the discharge enable voltage in response to the memory storing data corresponding to the second binary quantity. Third, a transition of the delay signal occurs at a time with respect to a transition of the match signal such that the hit signal does not reach the discharge enable voltage of the dynamic select circuit in response to the memory not storing data corresponding to the second binary quantity.

57 Claims, 8 Drawing Sheets

SELF-TIMED COMPARISON CIRCUITS AND SYSTEMS

TECHNICAL FIELD OF THE INVENTION

The present embodiments relate to digital systems, and are more particularly directed to self-timed comparison circuits and systems.

BACKGROUND OF THE INVENTION

Cache circuits are important components which are frequently used in contemporary microprocessors and the like to increase system performance by reducing the potential amount of time needed to access information. Typically, a cache circuit includes various components, such as a tag memory which is commonly a random access memory ("RAM"). The tag RAM stores so-called tag information which corresponds to the cached data which is commonly stored in a separate cache data RAM. The tag information may include various characteristics corresponding to the cached data, such as the actual address where the cached data may be found in some other memory device (e.g., an external memory structure). Another component of a cache circuit is the hit detection circuit associated with the tag RAM. The hit detection circuit (of which there are N such circuits in an N-way set associative cache circuit) compares an incoming address with the actual address stored as part of the tag information. If the comparison matches, there is said to be a "hit" in the cache circuit, that is, the data sought at the incoming address may be retrieved directly from the cache data RAM rather than having to go to the original (i.e., often external) memory to retrieve that data; on the other hand, if the comparison does not match, there is said to be a "miss" in the cache circuit, that is, the data sought at the incoming address is not located, or for some other reason is not reliable, within the cache data RAM.

The hit detection circuit is typically part of the speed limiting path of the cache circuit as a whole. Therefore, various designs have arisen to reduce the time required for comparison by the hit detection circuit, as well as the selection in response to a hit determined by that circuit. For example, FIG. 1 illustrates a prior art configuration including a hit detection circuit designated generally at 10. Circuit 10 includes a gated clock signal connected to the gate of a p-channel transistor 14 which has a source connected to a system voltage level (e.g., $V_{DD}$) and a drain connected to a match node 16. Match node 16 is connected to an integer number N+1 of single bit comparison circuits designated generally at 18, with two of those circuits $18_0$ and $18_N$ shown for purposes of illustration. Each circuit 18 is constructed in a like manner and, therefore, circuit $18_N$ is described in detail with it understood that like reference numbers are used in each similar such circuit with only a change in subscript to distinguish the different bit comparison circuits. Thus, turning to bit comparison circuit $18_N$, it includes an n-channel transistor $20_N$ with its drain connected to match node 16 and its source connected to ground. The gate of transistor $20_N$ is connected to the output of an exclusive OR ("XOR") gate $22_N$. A first input of XOR gate $22_N$ receives an incoming address bit $ADDRESS_N$, while a second input of XOR gate $22_N$ receives a corresponding address bit from the tag information and designated $TAG_N$. Match node 16 is also connected to the input of an inverter 24, and the output of inverter 24 is connected to a select circuit 26. Although not shown, note that actually the output of each XOR gate 22 is logically ANDed with the gated clock signal and the output of this logic AND combination is connected to a corresponding n-channel transistor 20. As a result, when the gated clock signal is low (i.e., when precharge is occurring), the output of this ANDed signal causes a low signal to be applied to each respective n-channel transistor 20 when precharging is occurring.

The operation of the components of FIG. 1 are well known to a person skilled in the art and, therefore, are only briefly addressed here. Generally the combination of all the XOR gates 22 from all of the bit comparison circuits 18 operate together to compare an entire incoming address with an address from the tag RAM (not shown). This determination indicates whether or not there is a hit in the cache circuit and, if a hit occurs, select circuit 26 selects the data, typically stored in a separate data RAM, which corresponds to the incoming address. Looking now more specifically to the circuit of FIG. 1, first the gated clock signal goes low during a precharge phase of operation. Consequently, the ANDing function described above with respect to the gated clock signal and the output of each XOR gate 22 (although not shown) forces the connection to the gate of each transistor 20 to be low during precharge. In addition, transistor 14 conducts and match node 16 is precharged to $V_{DD}$. Thus, this signal is inverted by inverter 24 and the output signal, $\overline{MATCH}$, is low during precharge. Thereafter, the gated clock signal goes high and each bit comparison circuit $18_0$ through $18_N$ compares its two input bits. For example, looking to circuit $18_N$, XOR gate $22_N$ determines whether $ADDRESS_N$ and $TAG_N$ are the same. If not (i.e., if there is a cache miss), XOR gate $22_N$ causes transistor $20_N$ to conduct, thereby discharging the precharge from match node 16 to ground. Consequently, the output of inverter 24 rises from low to high. Note further that if any one of the N+1 bit comparison circuits indicates a mismatch between its two inputs (i.e., again, if there is a cache miss), then it discharges match node 16 in a similar manner. Thus, only if each of those N+1 bit comparison circuits finds a match will match node 16 remain precharged. In other words, if the inputs for each of the XOR gates $22_N$ through $22_0$ do match, each corresponding transistor $20_N$ through $20_0$ remains off. Consequently, the output of inverter 24 remains low.

While the above discussion therefore demonstrates that circuit 10 may validly evaluate matches and mismatches between an incoming address and a tag address, note the configuration gives rise to various drawbacks. For example, typically the capacitive load imposed by select circuit 26 (as well as potential other loads) is considerably high. As a result, inverter 24 must be constructed of a sufficient size to drive that load. In turn, because inverter 24 is sized in this manner, each transistor 20 of a corresponding bit comparison circuit 18 also must be sized large enough to drive the large inverter 24. Otherwise, the speed of the circuit is reduced which may be an unacceptable performance penalty. On the other hand, there may be twenty or more bit comparison circuits and, therefore, it may be impractical to scale these components beyond a certain size. In addition to these drawbacks, note further the two output waveforms produced by the circuit of FIG. 1 when there is a miss or a hit. Specifically, when there is a hit, the output is originally precharged low, and then remains low in response to the hit. In contrast, when there is a miss, the output is again originally precharged low, but then transitions in response to the hit. The inventor of the present embodiments has recognized that given these waveforms, domino logic select circuits cannot be used as detailed below, and thus the types of circuitry within select circuit 26 may be limited to slower circuits, again thereby reducing the overall speed of the cache circuit.

In view of the above, there arises a need to address the drawbacks of prior art cache circuits and to provide higher speed self-timed cache circuits, systems, and methods for use with microprocessors and the like.

SUMMARY OF THE INVENTION

In one embodiment, there is a comparison circuit for selecting data in response to a first binary quantity and a second binary quantity. The comparison circuit includes a match circuit for outputting a match signal in response to comparing the first binary quantity and the second binary quantity. The comparison circuit also includes a delay circuit for outputting a delay signal in response to a signal generated at a same time as the second binary quantity, and circuitry for outputting a hit signal in response to the match signal and the delay signal. The hit signal indicates that a memory stores data corresponding to the second binary quantity. Still further, the comparison circuit includes dynamic select circuit for outputting a logic state of data corresponding to the first binary quantity and in response to the hit signal. The dynamic select circuit comprises a precharge node and at least one transistor coupled in a discharge path coupled to the precharge node. The at least one transistor is operable to conduct in response to the hit signal reaching a discharge enable voltage such that the precharge node is discharged and the logic state of the data changes in response thereto. The hit signal has various attributes. First, the hit signal is initially at a disable level insufficient to discharge the precharge node of the select circuit. Second, the hit signal transitions from the disable level to the discharge enable voltage in response to the memory storing data corresponding to the second binary quantity. Third, a transition of the delay signal occurs at a time with respect to a transition of the match signal such that the hit signal does not reach the discharge enable voltage of the dynamic select circuit in response to the memory not storing data corresponding to the second binary quantity. Various related embodiments, additional features, other circuits, systems, and methods are also disclosed and claimed.

DETAILED DESCRIPTION OF THE PREFERRED EMBODIMENTS

Figure 2:
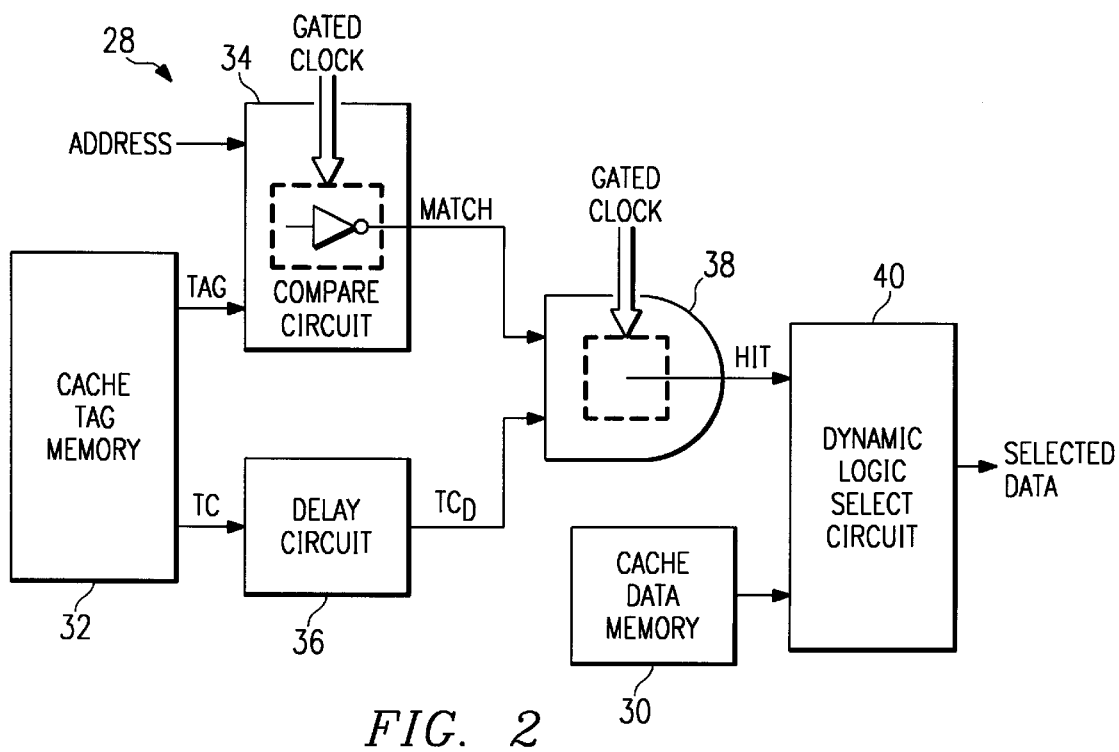
FIG. 2 illustrates a block diagram of a cache system in accordance with the present embodiments.

FIG. 2 illustrates a block diagram of a cache system 28 in accordance with the present embodiments. As an introductory matter, note toward the right side of the Figure that system 28 is shown to include a cache data memory 30. Cache data memory 30 represents any one of many known storage areas for storing and outputting a cache data block as known in the art. Thus, although additional details such as a control circuit are not shown, it is intended that circuit 30 depict a data storage area where that data is also stored in some alternative memory such as a larger external memory. When information which is stored in the alternative memory is desired, it may instead be retrieved more quickly from cache data memory 30 rather than having to expend additional time to access the alternative memory such as a large external memory.

System 28 includes toward its left side a cache tag memory 32, which also represents any one of many known storage areas for storing and retrieving cache tag information as known in the art. Specifically, system 28 like all caches includes address tags for each block of data stored in cache data memory 30. Any of the address tags may be output from tag memory 32 to a compare circuit 34 and, thus, FIG. 2 illustrates a "TAG" output by memory 32 to compare circuit 34. Compare circuit 34 also receives as a separate an address designated "ADDRESS" within FIG. 2. Typically, the ADDRESS signal is received from a central processor unit address bus or the like. As detailed below, compare circuit 34 compares a given ADDRESS with a given TAG and, in response, outputs a MATCH signal. Thus, if the ADDRESS matches the TAG, then the MATCH signal is asserted and, conversely, if the ADDRESS does not match the TAG, then the MATCH signal is not asserted. Note further that in the preferred embodiment the output of compare circuit 34 is precharged to a high level each time before it compares its ADDRESS and TAG inputs. For purposes of illustration, this precharge operation is shown in FIG. 2 by directing a gated clock signal to a dashed box which presents the output line of compare circuit 34, and which includes an inverter connected to that output line, with the suggestion that when the gated clock signal is low (i.e., precharge state) the inverter outputs the complement of that low. Note therefore that the MATCH output signal is initially high due to the precharge (which occurs when the gated clock is low), and thereafter MATCH either remains asserted high if ADDRESS matches TAG or, alternatively, is discharged low if ADDRESS does not match TAG.

Returning now to cache tag memory 32, note that at the same time it outputs the TAG, it also outputs an additional signal which, at this juncture, is referred to as a timing control signal (abbreviated "TC" in FIG. 2). In other words, the timing of TAG and TC and TC are matched by virtue of being output by the same device. The TC signal is connected as an input to a delay circuit 36 which, after a delay period, outputs in response to TC a delayed timing control signal (abbreviated "$TC_D$" in FIG. 2). For purposes detailed later, the $TC_D$ signal is asserted at a time which slightly precedes the time that the MATCH signal is output, with the timing detailed later once the various preferred schematics are explained. At this point, note that to achieve this timing, delay circuit 36 is constructed so that the delay between receiving TC and issuing $TC_D$ is slightly less than the same amount of time as that between when compare circuit 34 receives the TAG signal and thereafter issues the MATCH signal. Note further that the TC signal may be one of differing signals, but it preferably output by cache tag memory 32 because that memory outputs the TAG signal and by using the same structure to output both signals the relative timing described below remains the same; in other words, any characteristics affecting timing (e.g., processes variations, temperature, and the like) will equally affect both TC and the TAG signal and, therefore, the timing of those signals will remain the same, thereby providing the same delay and timing as described below. Moreover, the connections to ensure that $TC_D$ slightly precedes MATCH is directed toward optimal operation of the additional components of FIG. 2 as explained below.

The MATCH signal output by compare circuit 34 and the $TC_D$ signal output by delay circuit 36 are connected as inputs to a logic circuit 38. Logic circuit 38, given the preferred signal levels set forth below, is a logic AND gate. As detailed below, the output of logic AND gate 38 is precharged to a logic low level each time before it performs its logic operation on the MATCH and $TC_D$ inputs. For purposes of illustration, this precharge operation is shown in FIG. 2 by directing a gated clock signal to a dashed box which presents the output line of AND gate 38, with the suggestion that when the gated clock signal is low this output line outputs the same value as the gated clock. Note therefore when the gated clock signal is low (i.e., precharge phase), a low signal will be output by logic AND gate 38. The output of logic AND gate 38, which is timed as detailed below, provides the final signal indicating whether or not a cache hit occurred (i.e., whether the addressed data is stored in cache data memory 30). For purpose of discussion, therefore, this signal is shown as and referred to as a HIT signal. When this signal is high a cache hit has occurred, whereas when it is low a cache miss occurred.

The HIT signal output by logic AND gate 38 is connected as an input to a dynamic logic select circuit 40. Dynamic logic select circuit 40 also has as an input the data block corresponding to a given TAG output by cache tag memory 32. As detailed below, therefore, if the HIT signal indicates that a hit occurred for a given TAG, then dynamic logic select circuit 40 may select the data corresponding to that TAG. Once selected, select circuit 40 outputs the selected data (shown as "SELECTED DATA" in FIG. 2) for use by whatever component was addressing the data. Note that dynamic logic select circuit 40 operates using dynamic logic configured in a fashion as detailed below in connection with FIG. 8.

Although the specifics of dynamic logic circuit 40 and its timing are discussed later, it is helpful at this point to note that that dynamic logic circuitry such as that used in dynamic logic circuit 40 is characterized by having a precharged output signal, and by requiring a properly timed transition to occur in its input signals to discharge that output signal. With respect to the proper timing of dynamic logic input signals, data input to the logic may either discharge the precharged output, or leave it precharged. However, for a given cycle of operation (i.e., precharge followed by evaluation of the circuit output), the data cannot remain enabling after precharging is complete, and then transition to disabling as its correct final data value. For example, for a dynamic logic circuit using n-channel transistors to perform its logic operation, each n-channel transistor is enabled by a high signal and disabled in response to a high-to-low transition at its gate. Consequently, to be a valid input (i.e., acceptable for proper operation), any high-to-low transition must occur either during precharge or no later than the same time precharge is completing such that the high (which would be enabling) is no longer present as an input once precharging is complete. To better appreciate this, note what happens if the same high-to-low transition occurs sufficiently after precharge is complete. In this instance, the n-channel transistor(s) remains enabled after precharge was complete because the input to its gate is still high and has not yet transitioned to low; thus, the enabled n-channel transistor conducts and discharges the precharged output of the circuit. Once the input then transitions low, the output may remain discharged, thereby resulting in an erroneous output. In addition to the above example of n-channel transistors in dynamic logic, one skilled in the art will appreciate that the same transition rules apply to p-channel transistors in dynamic logic, but the polarity is reversed such that a low-to-high transition (which is disabling for p-channel transistors) must occur either during precharge or no later than when the precharge is completing.

Figure 1:
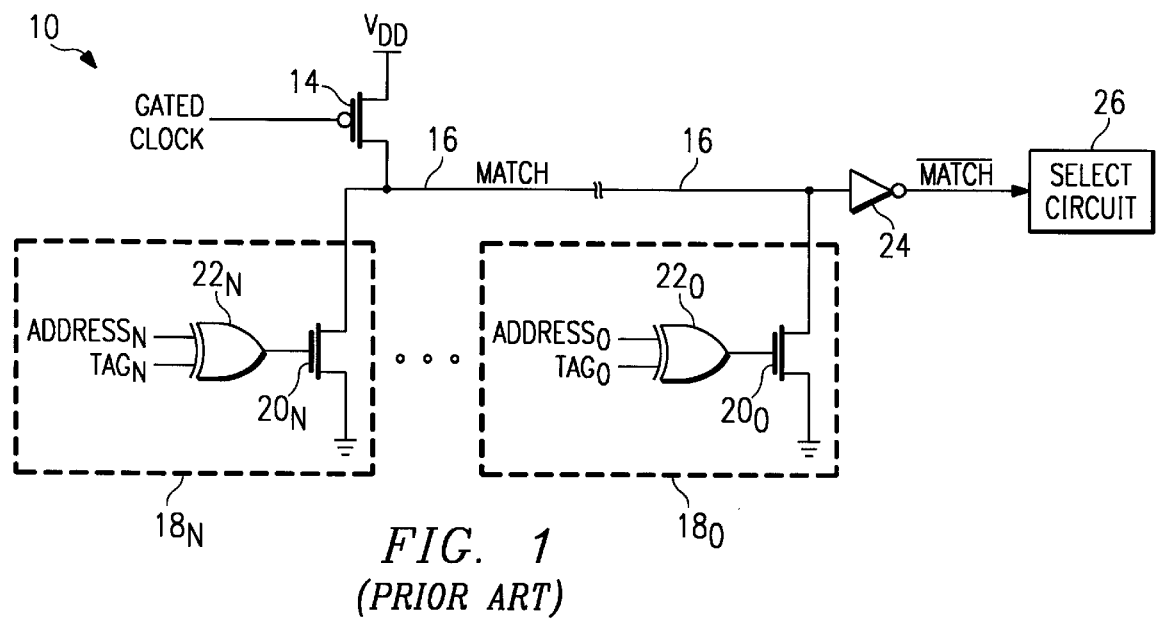
FIG. 1 illustrates a block diagram of a prior art address and tag compare circuit.

Given the above discussion of dynamic logic circuit 40, note further at this point that the connection of the HIT signal to a dynamic logic circuit of this type is permitted due to the fact that the waveform output by logic circuit 38 differs from that of the prior art circuit shown in FIG. 1. Specifically, recall that the output of the prior art circuit is precharged to a low level and transitions high in response to a cache miss, yet it is also precharged low but does not transition in response to a cache hit. The present inventor has recognized that such a waveform is not valid for driving a dynamic domino logic gate which responds to a hit by selecting appropriate data. Indeed, the inversion of such a signal is also not valid for driving dynamic domino logic because it would be precharged high and transition low upon a cache miss, but make no transition upon a cache hit. In either event, therefore, there is no enabling edge transition (e.g., such as a rising transition for an n-channel transistor) in the event of a cache hit. Thus, in contrast to the prior art, the HIT signal output of logic AND gate 38 is precharged to a given level (e.g., low) and transitions in response to a cache hit, yet it is also precharged low but does not transition in response to a cache miss. Since the transition occurs in response to a cache hit, then dynamic logic circuit 40 may then be enabled in response to the transition and in doing so select in response to the hit, yet take no action (or at least not output valid SELECTED DATA) in response to a cache miss. Thus, the preferred embodiments are configured to allow the use of dynamic logic in this fashion and, as known in the art, the inclusion of dynamic logic improves overall speed performance. Given this introduction, one skilled in the art will appreciate that system 28 of FIG. 2 operates to expeditiously compare an ADDRESS with a TAG, and to provide SELECTED DATA if there is a match based on that comparison. Certain inventive aspects, however, are best appreciated given the timing of this operation. In this regard, FIGS. 3a through 3e illustrate timing diagrams of such operation. To simplify the explanation, each of these Figures is discussed separately below.

Figure 3A:
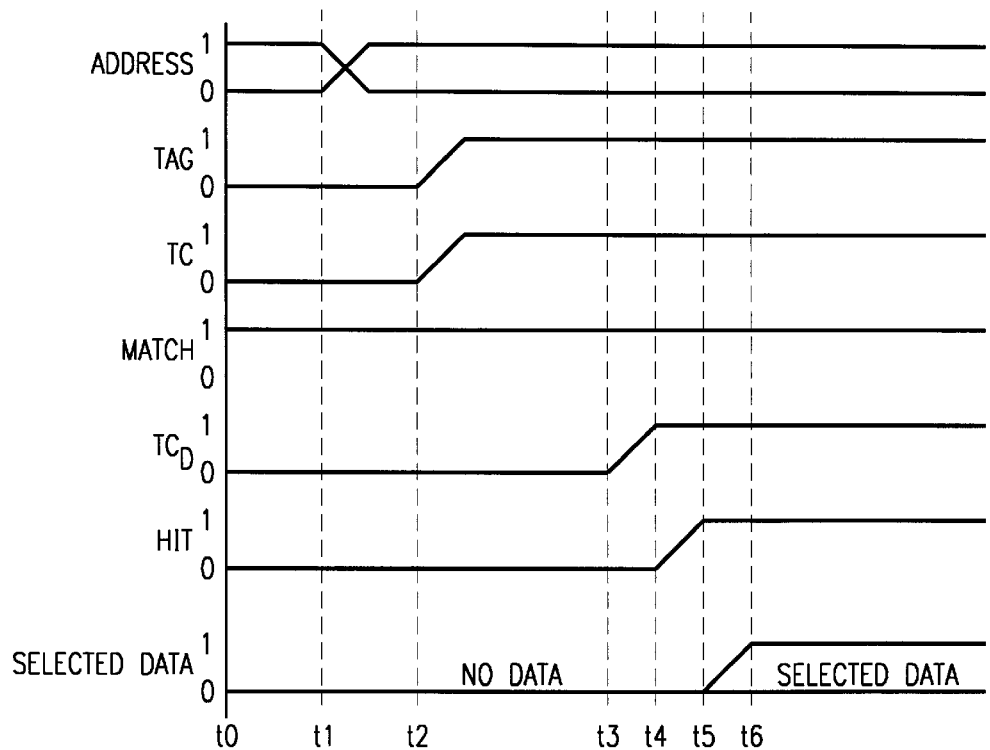
FIG. 3a illustrates a timing diagram of a hit sequence of the system of FIG. 2.

FIG. 3a illustrates a timing diagram of the operation of system 28 which results from a cache match. At time t0, precharge is occurring. Thus, no ADDRESS or TAG signal is applied to compare circuit 34 (or their effect is nullified using an AND operation with the precharge signal as in the manner described in connection with FIG. 1), the timing control signal TC is not yet applied to delay circuit 36, and MATCH is precharged high while HIT is precharged low.

At t1, a valid ADDRESS is submitted to system 28 so that the latter may determine whether the data addressed by that address is located for selection from cache data memory 30. After receiving the valid ADDRESS, system 28 is initiated by some type of control signal which, while not shown, is understood to initiate the various blocks to commence the process of determining whether the addressed data is stored in cache data memory 30, and output that information if it indeed is stored therein.

In response to the initiation control signal, at t2 cache tag memory 32 outputs both the TAG and TC signals. With respect to the TAG, note that a valid ADDRESS must precede the TAG; however, this is often easily accomplished because the TAG is preferably derived in response to one or more bits (typically least significant bits) of the ADDRESS and, therefore, only once those bits are available will the TAG thereafter become available (after some delay time for responding to those bits). Additionally, note that TAG is also a dual rail signal, meaning that tag memory 32 actually outputs both TAG and $\overline{TAG}$. Both TAG and $\overline{TAG}$ are precharged low before t2 and, thus, at t2 one of these two complementary signals rises. For purposes of demonstration, the rise is shown in TAG in FIG. 3a (as well as FIGS. 3b–e), with it understood however that the rise instead could be in $\overline{TAG}$. In either event, one skilled in the art will appreciate that the operation described below applies to either a transition in TAG or $\overline{TAG}$. With respect to the TC signal, and as demonstrated in greater detail below, the TC signal is used for timing purposes; thus, it is preferably any type of signal which may be output, or triggered, by memory 32 contemporaneously with the TAG signal (i.e., at the same time that either TAG or $\overline{TAG}$ begins to transition from low to high). For example, it is known in the cache art to include a way to know that the data of a cache data block is valid. In this regard, often the tag memory will concurrently output a so-called valid bit along with the TAG, which may or may not be considered part of the TAG. The state of the valid bit indicates whether or not the data corresponding to the output TAG is valid. Since the valid bit is therefore output by tag memory 32 contemporaneously with the TAG, it is an example of a signal which may be used as the TC signal. Moreover, as explained below, it is further preferable to use the valid bit as the TC signal because its value can be used to further determine whether or not a cache hit has occurred.

At t3, the delayed timing control signal $TC_D$ is output by delay circuit 36. Recall from above that delay circuit 36 is constructed in a manner to timely accomplish this second event. Particularly, by taking into account the construction of compare circuit 34, delay circuit 36 is constructed to be triggered by a signal (i.e., TC) at approximately the same time that compare circuit 34 begins its comparison, and to output an active high signal (i.e., $TC_D$) at a time which slightly precedes the time that the MATCH signal is output. The effects and limits of the permissible time between the output of $TC_D$ and the MATCH signal are explained later.

At t4, compare circuit 34 completes the logic operation to compare its ADDRESS and TAG inputs. Thus, the value MATCH output by compare circuit 34 at t4 may be considered a valid value. In the example of FIG. 3a, ADDRESS and TAG match. Further, because MATCH was already precharged to a high value, it remains active high to indicate the match of ADDRESS and TAG. The MATCH signal from t4 and the $TC_D$ signal from t3 are input to logic AND gate 38, which already has a precharged low output. Therefore, before t3, the HIT signal output by logic AND gate 38 is low. Moreover, before t4, $TC_D$ is low and therefore, regardless of the value of MATCH, the low value of $TC_D$ prior to t4 causes cause the output HIT signal to remain low.

At t5 in the example of FIG. 3a, the HIT signal output by logic AND gate 38 begins to rise. Specifically, recall at a time before t4, the HIT signal is precharged low as shown, and recall further that the value of $TC_D$ begins to rise at t4. As a result, the rise in $TC_D$, when ANDed with the already high value of MATCH, causes the output of logic AND gate 38 to rise after some latency period for the device. In the current example, therefore, this latency occurs between t4 and t5 and, after some minor additional time, at t6 the HIT signal is fully a logic high designating that a cache hit has occurred. Thus, at or around t6, dynamic logic select circuit 40 selects the data from data memory 30 which corresponds to the matching ADDRESS and TAG, and that selected data may then be output to the component(s) which sought the addressed data.

Figure 3B:
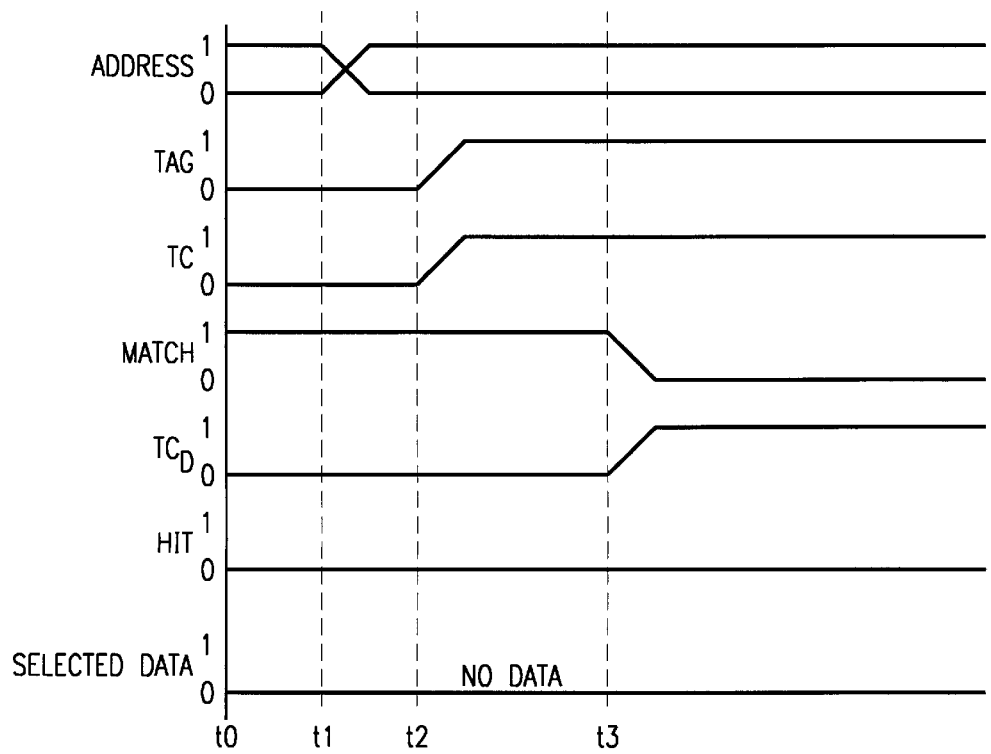
FIG. 3b illustrates a timing diagram of a miss sequence of the system of FIG. 2, where the transition of $TC_D$ and MATCH occur at approximately the same time.
Figure 3C:
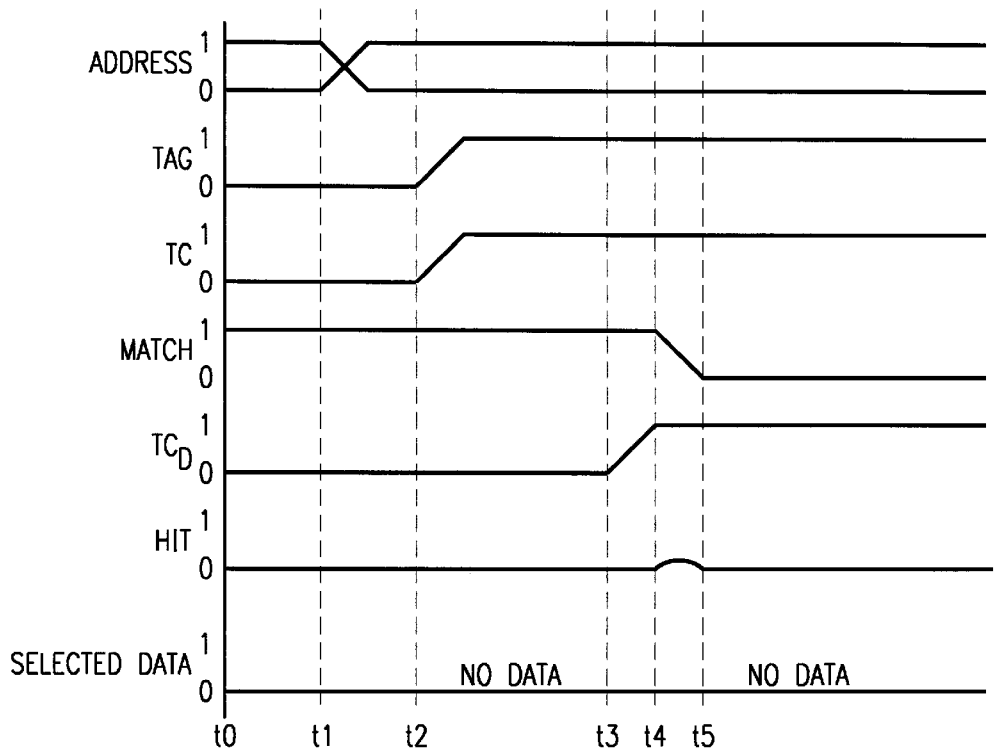
FIG. 3c illustrates a timing diagram of a miss sequence of the system of FIG. 2, where there is a slight delay between the transition of $TC_D$ and the transition of MATCH, thereby causing a minor output pulse in the HIT signal but which is insufficient to discharge the logic circuit of dynamic logic select circuit 40.
Figure 3D:
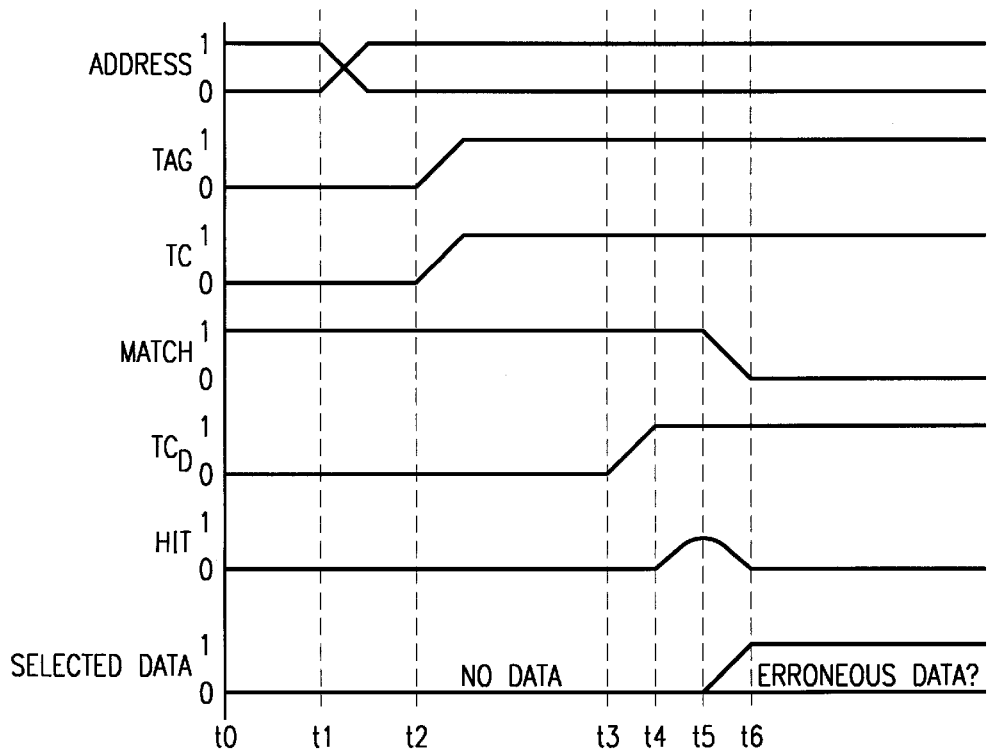
FIG. 3d illustrates a timing diagram of a miss sequence of the system of FIG. 2, where there is a larger delay between the transition of TCD and the transition of MATCH, thereby causing a greater output pulse in the HIT signal which is therefore sufficient to discharge the logic circuit of dynamic logic select circuit 40.

Having explained the timing of a system 28 hit as shown in FIG. 3a, FIGS. 3b through 3d illustrate the timing of system 28 miss (i.e., ADDRESS does not match TAG). Recall from above that $TC_D$ may slightly precede the issuance of MATCH. As detailed below, however, there is a limit such that $TC_D$ may not precede MATCH beyond a certain time period or else an unacceptable HIT signal may be output by AND gate 38, thereby causing an erroneous discharge operation of dynamic select logic circuit 40. To better introduce an appreciation of the permissible limit by which $TC_D$, may precede MATCH, FIG. 3b illustrates an instance where $TC_D$ occurs at the same time MATCH is valid, FIG. 3c illustrates an instance where $TC_D$ slightly precedes a valid MATCH signal but at an acceptable period, and FIG. 3d illustrates an instance where $TC_D$ precedes a valid MATCH signal by too much time, thereby giving rise to the possibility of an unacceptable HIT signal output by AND gate 38 and an erroneous operation of dynamic select logic circuit 40.

With reference to FIG. 3b, the events from t0 until t2 are the same as those discussed above in connection with FIG. 3a. Thus, the reader is referred above for the explanation as ADDRESS and TAG are applied to compare circuit 34 while TC is applied to delay circuit 36. Again, at t3, $TC_D$ transitions high due to the delay from TC being input to delay circuit 36. Also at t3, the MATCH signal becomes valid. In contrast to FIG. 3a, however, FIG. 3b demonstrates a cache miss; thus, at t3 the previously precharged MATCH signal begins its transition from high to low. Therefore, at or about the same time that $TC_D$ transitions from low to high, the MATCH signal transitions from high to low. Thus, AND gate 38 receives two inputs, one (i.e., $TC_D$) which is transitioning from low to high and another (i.e., MATCH) which is transitioning from high to low. Moreover, recall that HIT was previously precharged to a low as shown from t0 forward. Thus, with the two input signals transitioning in opposite directions at approximately the same time, HIT remains low as shown both before and after t3. Moreover, because a miss occurred, no data is selected by dynamic logic select circuit 40.

Figure 8:
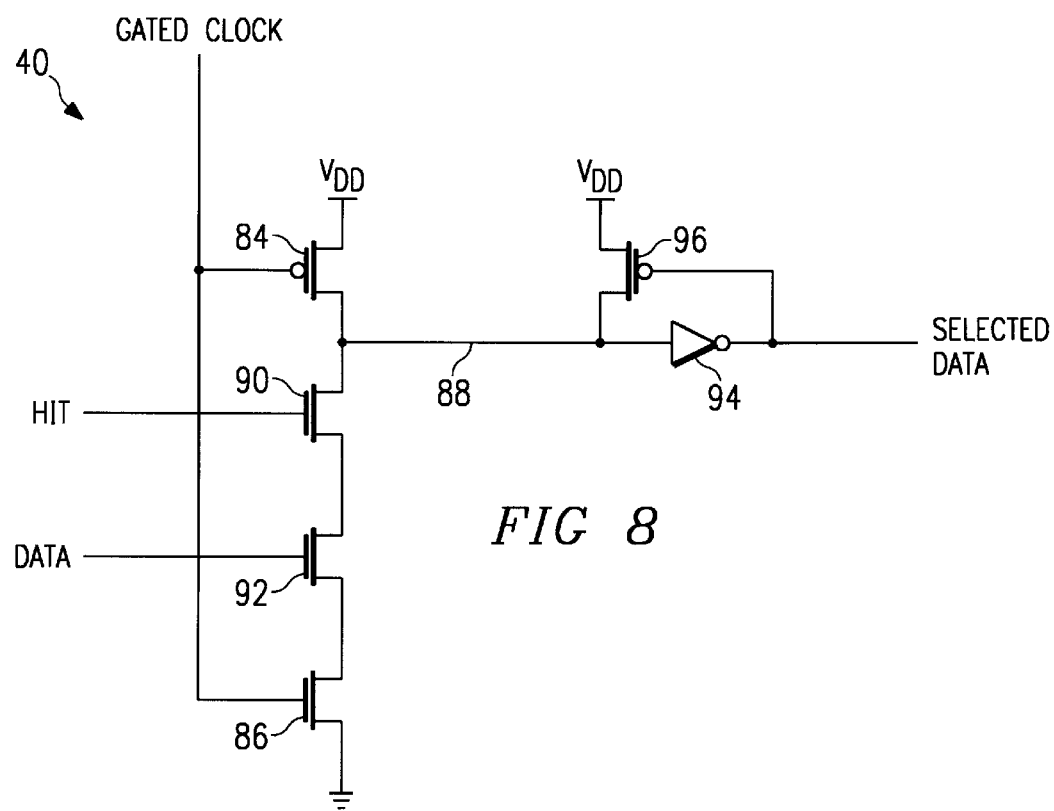
FIG. 8 illustrates a preferred schematic for the dynamic logic select circuit 40 from the system of FIG. 2.

With reference to FIG. 3c, it also shows an instance of a cache miss. In contrast to FIG. 3b, however, FIG. 3c further depicts that the timing of $TC_D$ has been adjusted so that $TC_D$ slightly precedes a valid MATCH signal from compare circuit 34, whereas in FIG. 3b those two events occurred at approximately the same time. Again, the events through t2 are the same as above. At t3, $TC_D$ begins its transition from low to high while MATCH remains high. Note, therefore, that for a short period of time by t4, both inputs to AND gate 38 of FIG. 2 are high; thus, the precharged low HIT output from AND gate 38 begins to slightly rise from low toward high. At t4, however, MATCH begins its transition from high to low, which concludes at t5. Thus, before HIT can rise to a significant extent, the MATCH input to AND gate 38 becomes low and therefore by t5 the HIT output of AND gate 38 returns low. In summary, therefore, the above action creates a slight output pulse in the HIT output signal. In the preferred embodiment, this temporary slight output pulse is acceptable so long as it does not cause an erroneous result in select circuit 40. More particularly, recall that HIT is connected to trigger the dynamic logic of dynamic logic select circuit 40. As known in the dynamic logic art, a dynamic logic circuit will have an input voltage threshold, referred to in this document as a discharge enable voltage, which when reached cause the logic transistor(s) (e.g., see n-channel transistor 90 of FIG. 8) of the circuit to sufficiently conduct as detailed later to the extent that the precharged output of the circuit is allowed to discharge and the circuit changes its output state (assuming any other logic input of device connected in the discharge path, such as that to transistor 92 in FIG. 8, is also enabled). In FIG. 2, the HIT output should only reach this discharge enable voltage when it is desirable to discharge dynamic logic circuit 40; thus, returning to FIG. 3c, it provides proper timing so long as the output pulse in HIT between t4 and t5 does not exceed the discharge enable voltage of dynamic logic select circuit 40. Indeed, to further illustrate this point, assume that that the output pulse in FIG. 3c is sufficiently small so that it does not exceed the discharge enable voltage in this manner, while FIG. 3d below demonstrates the opposite effect, that is, where an output pulse is unacceptably large and does exceed the discharge enable voltage of dynamic logic select circuit 40.

FIG. 3d again illustrates a cache miss and, as introduced above, also depicts an unacceptably large output pulse in the HIT output of logic AND gate 38. Specifically, FIG. 3d depicts an additional adjustment of the transition of $TC_D$ relative to the transition of MATCH so that the time between those two events is greater than that shown in FIG. 3c. The events through t3 are the same as those is FIG. 3c. Thus, at t3 $TC_D$ again begins its transition from low to high while MATCH remains high. However, at t4 when $TC_D$ has become fully high, MATCH continues also to be high (whereas it began its transition from high to low in FIG. 3c at t4). Again, therefore, both inputs to AND gate 38 of FIG. 2 are high and the precharged low HIT output from AND gate 38 begins to rise from low toward high. Thus, FIG. 3d illustrates an output pulse after t4, but note that it is larger in both magnitude and duration as opposed to the output pulse shown in FIG. 3c. The increase in magnitude and duration occurs because in FIG. 3c MATCH does not begin its transition from high to low until t5 and, therefore, from t4 to t5 both $TC_D$ and MATCH present high inputs to AND gate 38. Because the output pulse of FIG. 3d is larger than that of FIG. 3c, it is assumed for the sake of example that the output pulse in HIT is sufficient to trigger the dynamic logic of dynamic logic select circuit so that the circuit changes the state of its logic output. Consequently, dynamic logic select circuit 40 sufficiently discharges and, in response to doing so, selects data from cache data memory 30. However, recall that FIG. 3d illustrates a cache miss and, thus, no cache data should be selected. As a result, while no data should be output after t5 or t6, select circuit 40 outputs erroneous data.

From the above, therefore, one skilled in the art will appreciate that the transition of $TC_D$ relative to the transition of MATCH may be such that the former slightly precedes the latter, but only to the extent that the difference in time does not provide a discharge enable voltage to dynamic logic select circuit 40 when the memory data does not match that which is being addressed (i.e., when a cache miss occurs). Note that the output pulse in FIG. 3d is greater in both magnitude and duration that that in FIG. 3c. However, in an actual given embodiment, a shorter duration output pulse may require a higher magnitude in order to be sufficient to provide a discharge enable voltage and, similarly, a longer duration pulse may only require a lower magnitude output pulse to be sufficient to provide a discharge enable voltage. In all events, therefore, and as better appreciated by the schematics of the following Figures, the preferred embodiments provide proper timing of $TC_D$ relative to MATCH so that a discharge enable voltage of dynamic logic select circuit 40 is not reached in those instances where it should not be reached (i.e., during a cache miss) and, therefore, circuit 40 will not change its logic state in such instances. Of course, to further avoid the possibility of wrongfully reaching the discharge enable voltage of dynamic logic select circuit 40, the transition of $TC_D$ may be set to occur at the same time or after the transition (if any) of MATCH, but this approach may slow the overall performance of the embodiment. Lastly, note that the adjustment of these transitions will depend on many factors ascertainable by a person skilled in the art, and the magnitude and/or duration of the output pulse in HIT will depend on the particular details involved with dynamic logic select circuit 40.

Given the above, recall that it is stated that the TC signal may be the valid bit corresponding to a given TAG. Having explained the above operation, note further the additional benefit of using the valid bit in this manner. Particularly, when a valid bit is set to invalid, then a properly operating cache system should indicate a miss has occurred even if the ADDRESS matches the TAG. In contrast, when a valid bit is set to valid, then the comparison should be made to determine whether the ADDRESS matches the TAG. Thus, in system 28, the preferred embodiments connect the valid bit as the TC signal, where the valid bit equals a logic 0 for invalid and equals a logic 1 for valid. Given this connection, when the valid bit is a logic 1, the operation occurs in the manners set forth in FIGS. 3a through 3d. However, when the valid bit is a logic 0, the waveform of FIG. 3e results. Particularly, the waveform of FIG. 3e is again the same as that of FIGS. 3a and 3b prior to t3. At t3, however, the delayed signal $TC_D$ is the same as the input signal TC, but delayed some time, so here delay circuit 36 outputs a logic 0 as signal $TC_D$ rather than a logic 1 as in the cases of FIGS. 3a and 3b. As in the case of those earlier Figures, again $TC_D$ is output to precede slightly the time that compare circuit 34 outputs MATCH. In this instance, however, the low $TC_D$ signal is connected to logic AND gate 38; consequently, the HIT signal again stays low as in the manner of FIG. 3b, thereby indicating a cache miss. As stated above, this is the desirable result in the instance of an invalid cache data entry.

Given the above, note that the preferred embodiments provide a system which logically ANDs a cache valid signal with a MATCH signal, where the valid signal is delayed so that it transitions either slightly before or at approximately the same time as the MATCH signal. Moreover, in the preferred embodiment, the MATCH signal after precharge is at a high level and transitions to a low level to indicate a mismatch, while the valid signal after precharge is at a low level and transitions to a high level when a hit may occur (i.e., when the data at issue is valid). Note further that where the timing relationship between the output of the MATCH signal and the $TC_D$ signal is stated at approximately the same time, the word approximate is used because exact precision may not be achievable and because a proper result may still be reached with some minor fluctuation such that the two signals are issued at only approximately the same time. Note further that it has been shown that $TC_D$ may actually precede MATCH by some slight amount of time so long as the resulting HIT signal does not erroneously provide a discharge enable voltage to dynamic logic select circuit 40. One skilled in the art will be able to determine the tolerances based on factors such as the actual device performance, construction, loading, and fabrication processes. Having therefore described various aspects of the preferred embodiments, the following Figures and discussion show additional details which may be implemented to achieve and/or improve upon the above, and further demonstrate a microprocessor within which the cache system may be used at various different cache levels.

Figure 4:
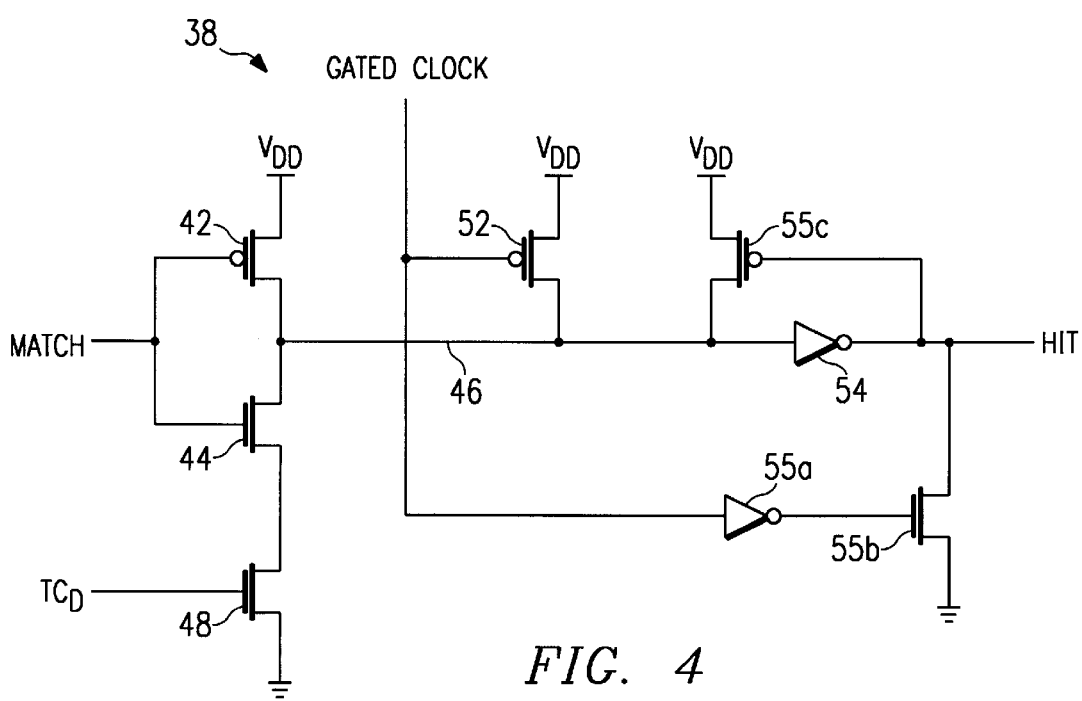
FIG. 4 illustrates a preferred schematic for the logic gate 38 from the system of FIG. 2.

FIG. 4 illustrates a schematic of the preferred components of logic AND gate 38 from FIG. 2. The MATCH signal input is connected to the gate of a p-channel transistor 42 and to the gate of an n-channel transistor 44. The source of p-channel transistor 42 is connected to $V_{DD}$ and the drain of p-channel transistor 42 is connected to a precharge node 46 as well as to the drain of n-channel transistor 44. The $TC_D$ input signal is connected to the gate of an n-channel transistor 48, and the source of n-channel transistor 48 is connected to a low reference potential (e.g., ground), while the drain of n-channel transistor 48 is connected to the source of n-channel transistor 44. The gated clock signal is connected to the gate of a p-channel transistor 52. The source of p-channel transistor 52 is connected to $V_{DD}$ and the drain of p-channel transistor 52 is connected to precharge node 46. Precharge node 46 is also connected to the input of an inverter 54, and the output of inverter 54 is the output node of AND gate 38, providing the HIT signal. A few additional items are shown in FIG. 4, with it understood that these features provide additional optional operations described below. Particularly, the gated clock is also connected to the input of an inverter 55a, and the output of inverter 55a is connected to the gate of an n-channel transistor 55b. The source of transistor 55b is connected to ground and the drain of transistor 55b is connected to the output of circuit 38. As another option, a p-channel transistor 55c has its gate connected to the output of circuit 38, its source connected to $V_{DD}$, and its drain connected to precharge node 46.

The detailed operation of logic AND gate 38 is described below, given the earlier understanding of its operation as described above in connection with FIGS. 2 through 3e. Before each application of the inputs to logic AND gate 38, the gated clock signal goes low while MATCH is high and $TC_D$ is low. In response, p-channel transistor 52 conducts, thereby precharging precharge node 46 to $V_{DD}$. This precharge on node 46 is inverted by inverter 54 such that a logic low is output for the HIT signal. Additionally, inverter 55a inverts the low state of the gated clock signal and connects a high signal to the gate of n-channel transistor 55b. As a result, n-channel transistor 55b conducts, connecting the HIT signal to ground and further thereby ensures that the HIT signal more quickly transitions low during the precharge phase. Indeed, note that use of n-channel transistor 55b allows a smaller n-channel transistor to be used within inverter 54, speeding up the critical rising transition for gate 38; thus, inverter 55a and transistor 55b are optional, but provide further speedup in the preferred embodiment. Next, the input values of MATCH and $TC_D$ are applied and, recall, generally arrive at approximately the same time, or with $TC_D$ arriving no earlier than slightly before MATCH. Next, consider respectively the instances shown in FIGS. 3a through 3e, each of which is discussed below.

Applying the signals of FIG. 3a to logic AND gate 38 of FIG. 4, around t0 the gated clock is low during the precharge phase of operation. Moreover, during precharge MATCH is originally high and so transistor 44 conducts while transistor 42 does not. In the meantime, $TC_D$ is precharged low so, at that time, transistor 48 does not conduct and precharge node 46 remains precharged. Consequently, the HIT signal output of AND gate 38 at that point remains low (because the precharge is inverted by inverter 54). At or before t2, the gated clock rises high to that circuit 38 and, thus, is ready for its evaluate phase of operation. At t3, $TC_D$ transitions from low to high. In response, transistor 48 conducts, and connects precharge node 46 to ground, thereby eventually discharging precharge node 46. As node 46 discharges, this level is inverted by inverter 54 and, consequently, the HIT signal output by AND gate 38 at that point transitions high.

Applying the signals of FIG. 3b to logic AND gate 38 of FIG. 4, during precharge again MATCH is high and $TC_D$ is low; thus, again transistor 44 conducts while transistors 42 and 48 do not. Consequently, precharge node 46 remains precharged and the HIT signal output by AND gate 38 at that point remains low. Indeed, even after transistor 52 is no longer conducting (because the gated clock signal goes high after precharge), note that while the HIT signal is low, it causes p-channel transistor 55c to conduct, thereby maintaining precharge node 46 at a high. At t3, MATCH transitions from high to low while $TC_D$ transitions from low to high. In response to MATCH, while transistor 44 is turning off transistor 42 is turning on; thus, the latter begins to connect precharge node 46 to $V_{DD}$. As transistors 42 and 44 operate in this manner, the rise of $TC_D$ is turning transistor 48 on. Note, therefore, that at t3 there may be some overlap time when each of transistors 42, 44, and 48 is conducting at least in part. As a result, the precharged high potential at precharge node 46 may actually begin to slightly drop. Continuing slightly after t3, however, transistor 44 will turn fully off while transistor 42 turns fully on; thus any immediately preceding slight drop at precharge node 46 is then eliminated as transistor 42 again connects that node to $V_{DD}$. Note that the slight drop at precharge node 46 should be insufficient to flip the output state of inverter 54 and, therefore, following t3 the HIT output signal remains low. Note further that the low HIT signal causes p-channel transistor 55c to conduct, thereby maintaining precharge node 46 at a high even though p-channel transistor 52 is no longer conducting (because the gated clock signal is now high).

Applying the signals of FIG. 3c to logic AND gate 38 of FIG. 4, again after precharge transistor 44 conducts while transistors 42 and 48 do not, precharge node 46 remains precharged, and HIT at that point is low. At t3, $TC_D$ transitions from low to high while MATCH remains high. In response to MATCH, transistor 44 remains on while, in response to $TC_D$, transistor 48 turns on. Because both transistors 44 and 48 are on, precharge node 46 is pulled farther towards ground and the HIT output begins to rise as shown by the output pulse following t4. By t5, however, MATCH fully transitions from high to low so that transistor 42 conducts while transistor 44 does not. As a result, precharge node 46 is pulled high and the HIT output returns low, thereby concluding the output pulse as shown in FIG. 3c at t5. In view of the above, therefore, note that even though n-channel transistors 44 and 48 are concurrently conducting in part, at some short point thereafter n-channel transistor 44 will turn fully off while p-channel transistor 42 turns fully on, with the latter again ensuring that precharge node 46 is connected to rise to the level of $V_{DD}$. Accordingly, given a small pulse at precharge node 46, only a smaller pulse, if any, will appear in the HIT signal.

The application of the signals of FIG. 3d to logic AND gate 38 of FIG. 4 is the same as that of FIG. 3c, with the only difference being that the time between the transition of $TC_D$ from low to high and the transition of MATCH from high to low is greater. Thus, without revisiting the detail from above, note that this increase in time increased the time period in which transistors 44 and 48 are both conducting; consequently, precharge node 46 is pulled toward ground and the HIT signal rises high for a greater amount of time such that the negative pulse on node 46 is larger in magnitude and duration, and the HIT output pulse in FIG. 3d is of greater magnitude and duration as compared to FIG. 3c. As better appreciated in connection with FIG. 8, below, this increase in the HIT output pulse as compared to FIG. 3d is shown as an example where the pulse is too large and, therefore, wrongfully reaches the discharge enable voltage of dynamic logic select circuit 40 (thereby erroneously causing it to change its logic output state).

Figure 3E:
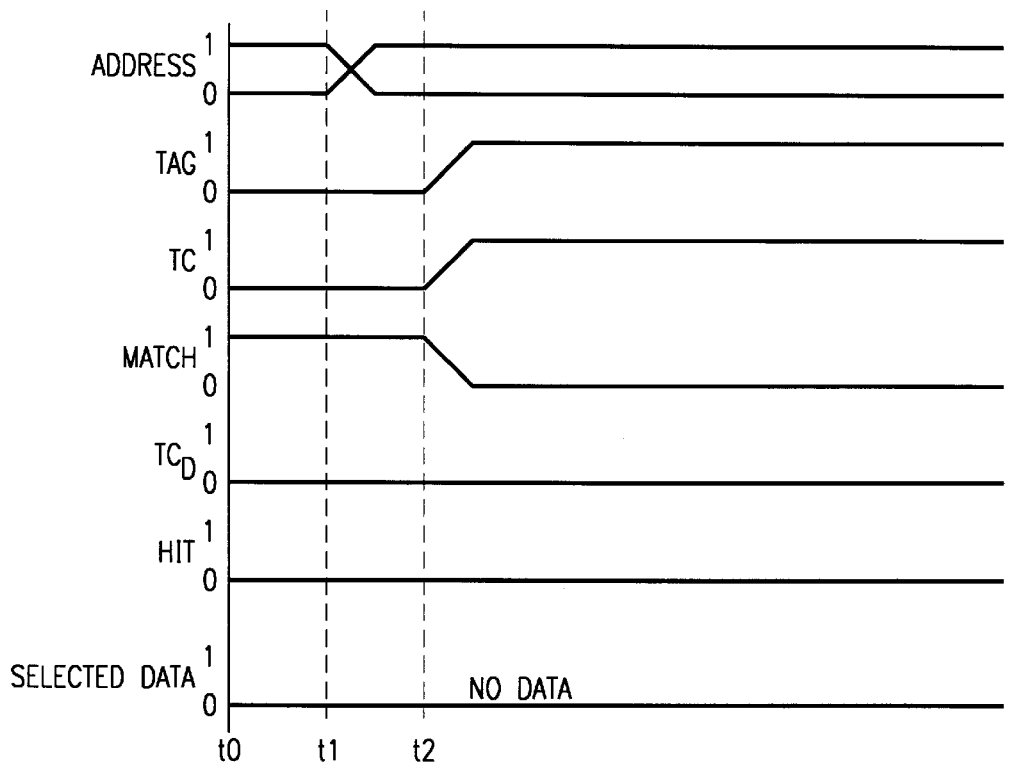
FIG. 3e illustrates a timing diagram of a sequence involving an invalid cache block in the system of FIG. 2.

Applying the signals of FIG. 3e to logic AND gate 38 of FIG. 4, note that transistors 42 and 44 respond in the same manner as described immediately above as MATCH transitions from high to low. In addition, however, recall that $TC_D$ remains low throughout FIG. 3e. Thus, transistor 48 in no instance conducts and precharge node 46 remains precharged. Again, therefore, inverter 54 inverts this precharged signal and the HIT output signal by AND gate 38 remains low.

Figure 5:
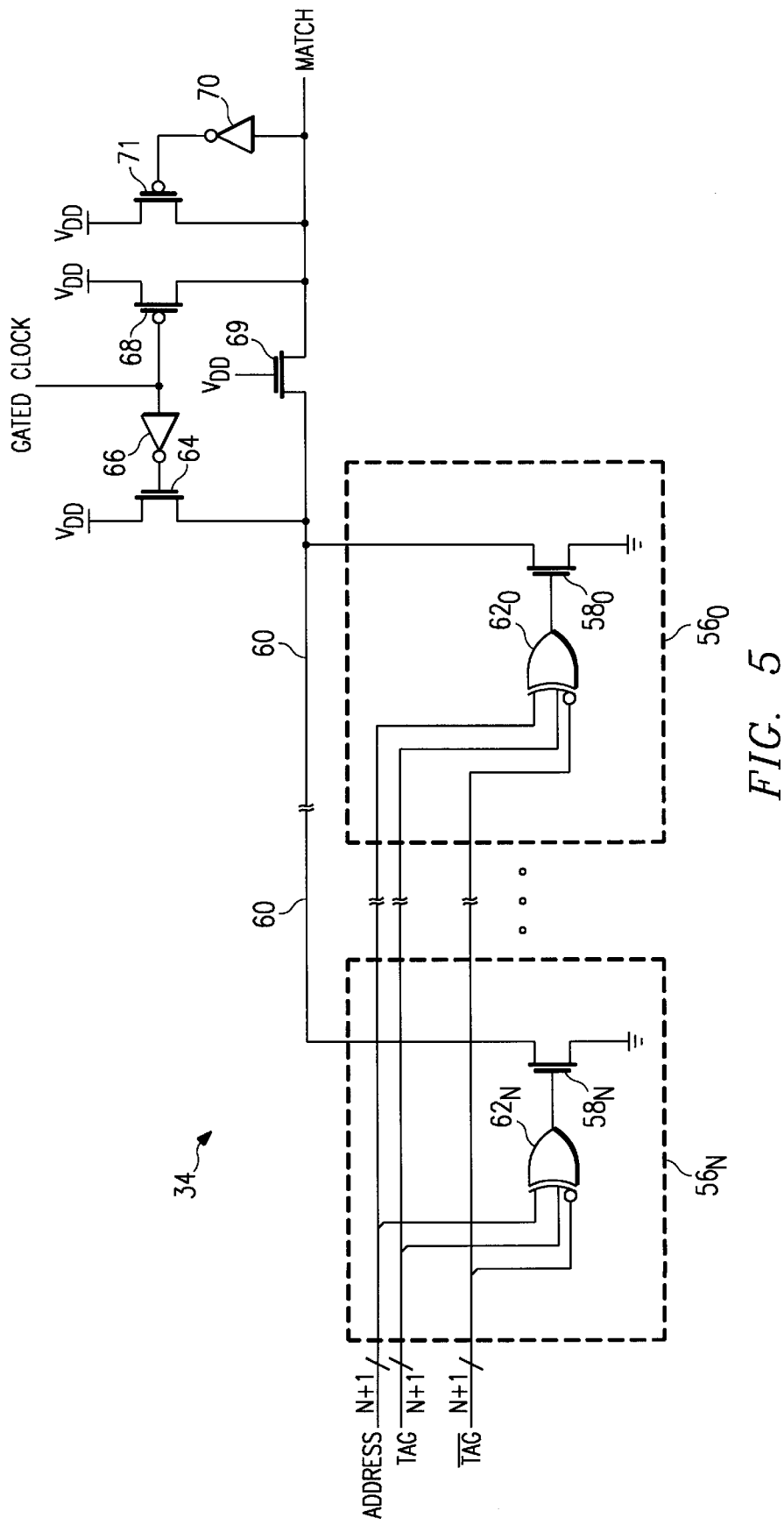
FIG. 5 illustrates a preferred schematic for the compare circuit 34 from the system of FIG. 2.

FIG. 5 illustrates a schematic of the preferred components of compare circuit 34 from FIG. 2. Compare circuit 34 includes a group of N+1 single bit comparison circuits designated generally at 56, with one bit from each of the N+1 ADDRESS and TAG bits connected to a corresponding single bit comparison circuit. To simplify the Figure, only two circuits $56_0$ and $56_N$ are shown, with it understood that N+1 could equal twenty (or more) in which case a total of twenty such circuits would be included. In any event, each circuit 56 is constructed in a like manner and, therefore, circuit $56_N$ is described in detail with it understood that like reference numbers are used in each similar such circuit with only a change in subscript to those reference numbers to distinguish the different bit comparison circuits. Bit comparison circuit $56_N$ includes an n-channel transistor $58_N$ with its drain connected to a precharge node 60 and its source connected to a low reference voltage (e.g., ground). The gate of transistor $58_N$ is connected to the output of an exclusive OR ("XOR") gate $62_N$. A first input of XOR gate $62_N$ receives an incoming address bit $ADDRESS_N$, while a second input of XOR gate $62_N$ receives a corresponding address bit from the tag information and designated $TAG_N$. Indeed, for purposes explained below, dual rail $TAG_N$ signals are connected to XOR gate $62_N$ and, thus, the second input of XOR gate $62_N$ is actually a dual rail input and therefore also receives $\overline{TAG_N}$. The gated clock signal is connected to the gate of an n-channel transistor 64 through an inverter 66. The drain of n-channel transistor 64 is connected to $V_{DD}$ while the source of n-channel transistor 64 is connected to precharge node 60. The gated clock signal is also connected to the gate of a p-channel transistor 68, which has its source connected to $V_{DD}$ and its drain connected to the MATCH output of compare circuit 34. An n-channel transistor 69 is connected with its gate to $V_{DD}$, its source to precharge node 60, and its drain to the MATCH output of compare circuit 34. Lastly, the MATCH output of compare circuit 34 is connected to the input of an inverter 70, with the output of inverter 70 connected to the gate of a p-channel transistor 71 having its source connected to $V_{DD}$ and its drain connected to the output of circuit 34.

The operation of compare circuit 34 of FIG. 5 is as follows. Initially, the gated clock signal goes low for the precharge phase, thereby causing both n-channel transistor 64 and p-channel transistor 68 to conduct (the former because inverter 66 inverts the low clock signal and connects the resulting high signal to the gate of n-channel transistor 64). Note that because transistor 64 is an n-channel device, precharge node 60 is therefore precharged to a level equal to $V_{DD}$ minus the threshold voltage ("$V_T$") of n-channel transistor 64. In contrast, because transistor 68 is a p-channel device, the output node of compare circuit 34 is precharged through that device fully to the value of $V_{DD}$. Moreover, n-channel transistor 69 isolates precharge node 60 from the output node and, therefore, these two nodes originally maintain the different values of $V_{DD}$-$V_T$ and $V_{DD}$, respectively. Still further, note that during the precharge phase the output of each XOR gate 62 is kept low as evident by the discussion below of FIG. 6. After the precharge phase, the gated clock signal goes high; during this instance, the precharged high value of the MATCH signal is inverted by inverter 70 which causes p-channel transistor 71 to conduct, thereby maintaining the MATCH signal high even though it is no longer being driven by p-channel transistor 68 (which is now off because the gated clock signal has risen high). Additionally, once the gated clock signal is high, compare circuit 34 operates such that precharge node 60 remains precharged only if each pair of ADDRESS and TAG bits matches, as evaluated by a corresponding bit comparison circuit $56_0$ through $56_N$. For example, looking at bit comparison circuit $56_N$, if its inputs $ADDRESS_N$ and $TAG_N$ match, the output of XOR gate $62_N$ is low (i.e., non-enabling to transistor $58_N$) and transistor $58_N$ does not conduct. Thus, assuming all other bit circuits match in this manner, each respective transistor 58 also does not conduct and precharge node 60 remains precharged, resulting in a positive output signal indicating a match. In contrast, however, if any one of the bit comparison circuits $56_0$ through $56_N$ results in a mismatch, then its output is enabling to its respective transistor 58 and so that transistor conducts, thereby discharging the precharged level on precharge node 60 and causing the output of the circuit to transition from high to low (i.e., thereby indicating a mismatch). Note further that by including n-channel transistor 64, the amount of voltage being discharged is not $V_{DD}$, but rather, is the lesser amount of $V_{DD}$-$V_T$; as a result, the time needed to fully discharge precharge node 60 is reduced and, therefore, the operational speed of compare circuit 34 is increased. Despite the above, however, note that transistors 64 and 69, along with inverter 66, could be removed from FIG. 5 and, in that instance precharge node 60 would be directly connected to the drain of transistor 68. This alternative provides a simpler circuit, but would slow overall performance.

Figure 6:
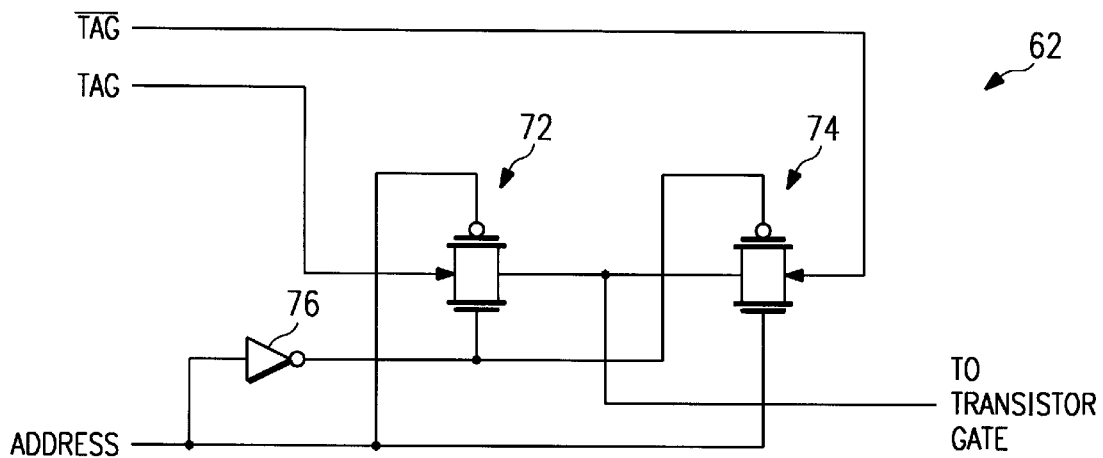
FIG. 6 illustrates a preferred schematic for the XOR gate 62 from the compare circuit 34 of FIG. 5.

FIG. 6 illustrates a schematic of the preferred components of XOR gate 62 used in each of the bit compare circuits 56 from FIG. 5. As shown above in FIG. 5, in the preferred embodiment XOR gate 62 actually receives dual-rail gated clock signals from cache tag memory 32 such that both the value of TAG and its complement $\overline{\text{TAG}}$ are received by the circuit, with it understood that as gated clocked signals both are precharged low and one or the other will transition to high after the precharge phase; moreover, it also is understood that circuit 62 is to output a high if ADDRESS and TAG do not match and a low if ADDRESS and TAG do match. Turning then to the details of FIG. 6, the TAG signal is connected to the input of a transfer gate 72. Similarly, the $\overline{\text{TAG}}$ signal is connected to the input of a transfer gate 74. The outputs of transfer gates 72 and 74 are connected to one another, and provide the logic output for XOR gate 62. The ADDRESS input of XOR gate 62 is connected to the n-channel control of transfer gate 74 and to the p-channel control of transfer gate 72. Further, the ADDRESS input of XOR gate 62 is also connected to the input of an inverter 76. The output of inverter 76 is connected to the p-channel control of transfer gate 74 and to the n-channel control of transfer gate 72.

The operation of XOR gate 62 is as follows. The value of ADDRESS causes only one of the two transfer gates 72 or 74 to conduct at a time. If ADDRESS is high, transfer gate 74 conducts and transfer gate 72 does not; conversely, if ADDRESS is low, transfer gate 74 does not conduct and transfer gate 72 does conduct. Further, the conducting transfer gate will connect its input to the output of XOR gate 62. During the precharge phase, recall that both TAG and $\overline{\text{TAG}}$ are low. As a result, regardless of which transfer gate 72 or 74 conducts, XOR gate 62 will output a low (which recall is non-enabling to a respective n-channel transistor 58). Once precharge is complete, one skilled in the art will appreciate that the circuit ultimately produces the XOR function. For example, if ADDRESS is high and TAG is low, transfer gate 74 connects its high input to the output of XOR gate 62, thereby indicating a mismatch between ADDRESS and TAG. As another example, if ADDRESS is high and TAG is high, transfer gate 74 connects its low input to the output of XOR gate 62, thereby indicating a match between ADDRESS and TAG. The similar operation of transfer gate 72 will likewise be appreciated by a person skilled in the art.

Figure 7:
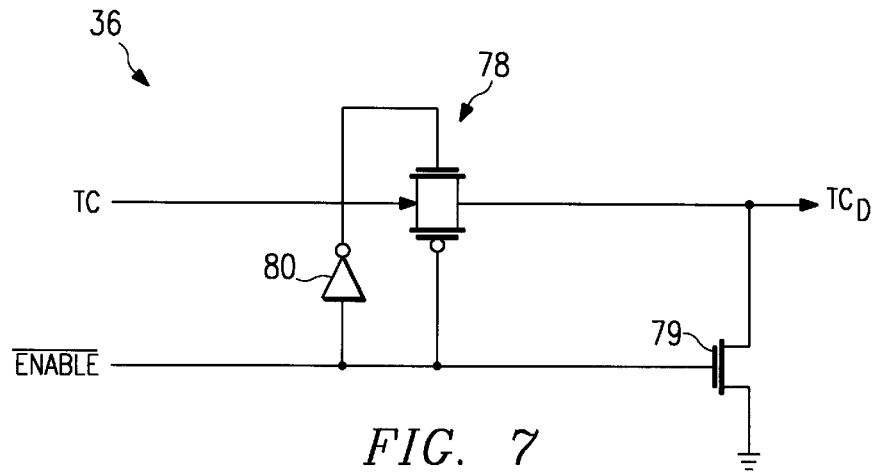
FIG. 7 illustrates a preferred schematic for the delay circuit 36 from the system of FIG. 2.

FIG. 7 illustrates a schematic of the preferred components for delay circuit 36, with the input signal TC connected to the input of a transfer gate 78, and the output of transfer gate provides the delayed signal, $TC_D$, and is also connected to the drain of an n-channel transistor 79. The source of n-channel transistor 79 is connected to ground, and its gate is connected to the complement of an ENABLE signal, shown as $\overline{\text{ENABLE}}$. The $\overline{\text{ENABLE}}$ signal is also connected to the p-channel gate of transfer gate 78, and through an inverter 80 to the n-channel gate of transfer gate 78. The operation of delay circuit 36 is described immediately below, considering first the instance when ENABLE is asserted and second the instance when ENABLE is de-asserted.

When ENABLE is asserted, it and its complement cause transfer gate 78 to conduct and, thus, $TC_D$ is the same signal as TC, but is delayed by one transfer gate delay (i.e., the delay attributable to transfer gate 78). Recall from above that it is preferred that $TC_D$ becomes valid slightly before MATCH. An understanding of FIG. 7 is now better understood by returning to certain prior figures. From FIG. 5, note that MATCH results after various delays, including the operation of each XOR gate 62 and the discharge of node 60. From FIG. 6, note that each XOR gate 62 will provide its output after one transfer gate delay (i.e., the delay of either transfer gate 72 or transfer gate 74). Returning to FIG. 7, therefore, the one transfer gate delay between TC and $TC_D$ is structurally the same, and therefore approximates, the one transfer gate delay of XOR gate 62 in FIG. 6. Thus, the time between the transition of $TC_D$ and the transition (if any) of MATCH may be stated to be approximately the time it takes to discharge node 60 in FIG. 5. Indeed, note further that the capacitive loads connected to $TC_D$ actually may be significantly larger than those imposed on the XOR gates 62 which ultimately may affect the MATCH signal (e.g., on the order of double); therefore, $TC_D$ may actually transition slightly later than a transition in the output of one of the XOR gates 62.

When ENABLE is de-asserted, transfer gate 78 does not conduct TC from its input. Moreover, n-channel transistor 79 conducts, thereby connected the $TC_D$ signal to ground. Recall further that in the preferred embodiment, $TC_D$ is derived from the cache valid signal. Thus, by de-asserting ENABLE, the system will respond as if the cache data at issue is not valid (because $TC_D$ will be low), and therefore the system will respond as if a cache miss has occurred.

FIG. 8 illustrates a schematic of the preferred components for dynamic logic select circuit 40, with the circuit simplified to depict only a single way selection rather than an N-way selection which would be used for an N-way set associative cache. Select circuit 40 is connected in general in a known domino fashion, and includes a gated clock signal connected to the gate of a p-channel transistor 84 and to the gate of an n-channel transistor 86. The source of p-channel transistor 84 is connected to $V_{DD}$ and the drain of p-channel transistor 84 is connected to a precharge node 88. The source of n-channel transistor 86 is connected to ground. For reasons stated below, n-channel transistor 86 is optional in the preferred embodiment. Between the drain of p-channel transistor 84 and the drain of n-channel transistor 86 is connected two n-channel transistors 90 and 92 connected to perform the logic operation for the circuit, which in this embodiment is an AND function which in effect outputs the value of the DATA in response to a cache hit. Particularly, the gate of n-channel transistor 90 receives the HIT signal and the gate of n-channel transistor 92 receives the DATA which may be selected and output as the SELECTED DATA depending on the value of the HIT signal as detailed below. Lastly, precharge node 88 is connected to an inverting half-latch including an input to an inverter 94 which has its output connected to the output of circuit 40 as well as to the gate of a p-channel transistor 96. Note that the half-latch is referred to in this manner as it includes a p-channel feedback transistor, but does not include a feedback n-channel transistor. The source of p-channel transistor 96 is connected to $V_{DD}$ and the drain of p-channel transistor 96 is connected to precharge node 88.

The operation of circuit 40 is as follows. Initially, the gated clock signal goes low during the precharge phase, thereby causing p-channel transistor 84 to conduct. At this point, therefore, precharge node 88 is connected to $V_{DD}$ and that value is inverted so that the SELECTED DATA output is low. Note further, therefore, that after this precharging step the precharge node 88 is placed at a potential which will transition to a level representing a change in logic level only if node 88 is discharged through a discharge path consisting of the conductive paths through the source/drains of transistors 90, 92, and 86. Next, the gated clock signal transitions high, thereby causing transistor 86 to conduct; thus, one transistor in the discharge path is conducting, but node 88 does not discharge unless all transistors connected in series along such a path conduct. Accordingly, select circuit 40 at this point operates as a dynamic logic AND gate, such that DATA is passed through the gate if HIT transitions high or, alternatively, the DATA is masked or blocked by the gate if HIT remains low. For example, in the first instance, if HIT transitions from low to high and remains high long enough to reach the discharge enable voltage as defined above, transistor 90 conducts. If DATA is also high, then transistor 92 also conducts. Since transistor 86 is already conducting (because the gated clock signal is now high), precharge node 88 is connected to ground and the output of circuit 40 changes state to match the high value of DATA. Conversely, if DATA is low, then transistor 92 does not conduct and precharge node 88 remains high and does not transition low; again, therefore, the SELECTED DATA matches the value of the DATA signal (i.e., low). Still further, if HIT is low, transistor 90 does not conduct and, thus, regardless of the DATA value, precharge node 88 remains precharged high and is inverted so that the SELECTED DATA output remains low. Finally, recall from earlier that it is stated that n-channel transistor 86 is optional. Having now appreciated the input signals and their transitions, note that HIT is always below the discharge enabling voltage of circuit 40 during precharge and, therefore, precharge node 88 is prevented from discharging during the precharge phase of operation. Because n-channel transistor 86 also exists to prevent such a discharge from occurring, it may be removed (with the source of transistor 92 then connected to ground) so long as it is ensured that HIT is indeed incapable of reaching the discharge enabling voltage of circuit 40 during the precharge phase of operation.

Given the description of FIG. 8, note that it includes dynamic logic which may be quickly and efficiently triggered by the low-to-high transition of the HIT signal from circuit 38 when a cache hit occurs. Moreover, as introduced above, proper timing is ensured given the use of the above signals. Particularly, for a given cycle of operation (i.e., precharge followed by evaluation of the circuit output), the data to dynamic logic select circuit 40 cannot remain enabling after precharging is complete, and then transition to disabling. During precharge, this data is kept non-enabling (e.g., low) because AND gate 38 is precharged low. Moreover, with the proper timing of $TC_D$ and MATCH, this data may then transition high upon a hit, but cannot be high and then transition low. Additionally, as mentioned above, FIG. 8 depicts only a single way selection. However, one skilled in the art may add series pairs of n-channel transistors in parallel with transistors 90 and 92, where each additional pair would be operable such that an asserted HIT signal on one transistor would cause the DATA on the series paired transistor to be output as the SELECTED DATA.

Figure 9:
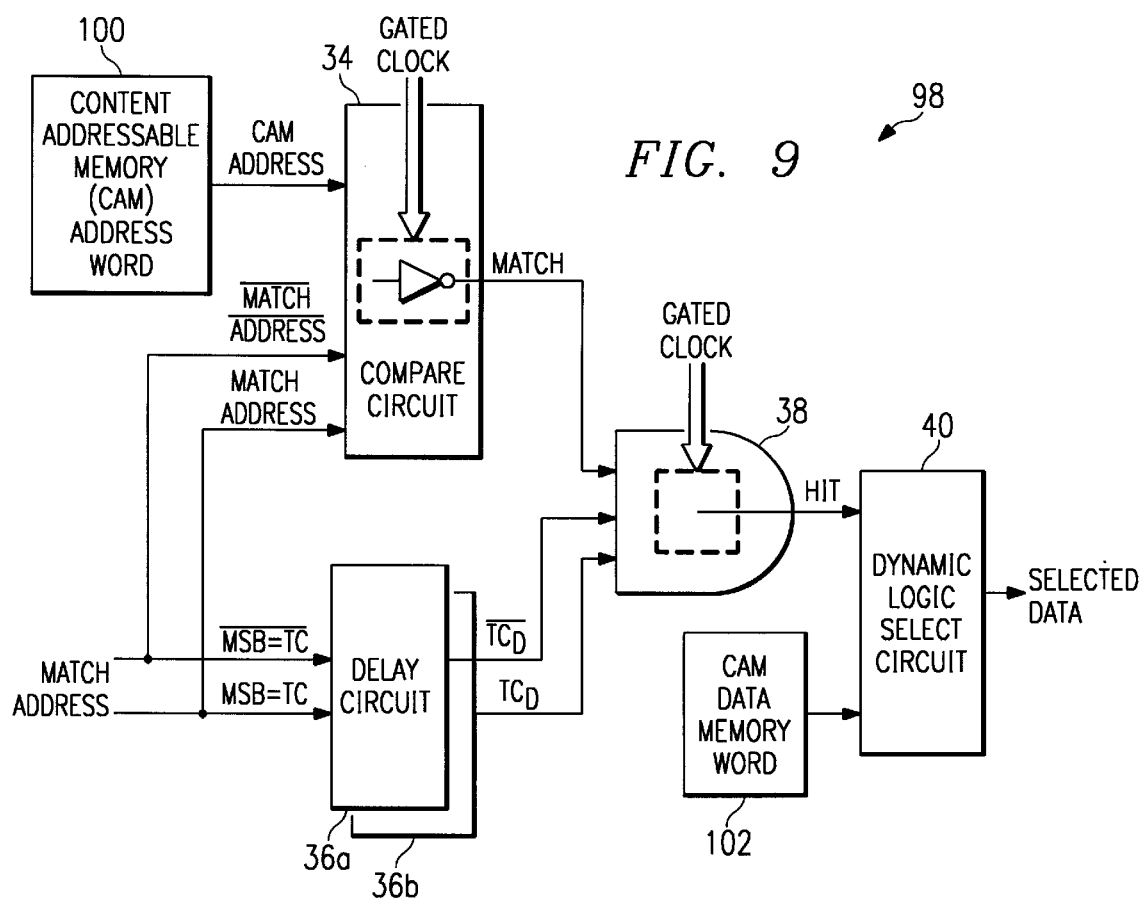
FIG. 9 illustrates a block diagram of a content addressable memory system in accordance with the present embodiments.

FIG. 9 illustrates a content addressable system designated generally at 98. Before detailing system 98, note that while the above FIGS. 2 through 8 depict the application of the present embodiments in the context of a cache system, FIG. 9 and its description demonstrate that many of the same principles, circuits, and techniques set forth above apply in at least another context. Indeed, one skilled in the art may well appreciate still further applications of the principles set forth in this document when comparing two multi-bit signals and making a selection in response to that comparison. Given that introduction, note further that due to the commonality between FIGS. 2 and 9, like reference numerals are used to designate those aspects which are the same in those Figures. As known in the CAM art, typically a CAM system compares a portion of information with the contents of a CAM and, if the portion matches the contents, an additional amount of information corresponding to the matched portion is selected from the CAM memory and output. Applying this generally to FIG. 9, system 98 compares an ADDRESS from a content addressable memory ("CAM") address word 100 with a MATCH ADDRESS. If the ADDRESS and the MATCH ADDRESS are found to match, dynamic logic select circuit 40 selects the data corresponding to the match from a CAM data memory word 102 and outputs that data as its SELECTED DATA. Specifically, CAM address word 100 outputs the CAM ADDRESS to compare circuit 34. Additionally, the MATCH ADDRESS signal is received from a central processor unit address bus or the like and is also connected to compare circuit 34. Note that the MATCH ADDRESS signal is preferably a clocked dual rail signal; thus, both MATCH ADDRESS and $\overline{\text{MATCH ADDRESS}}$ are connected as inputs to compare circuit 34. Still further, when the MATCH ADDRESS signal (and its complement) is issued, either a portion of it, or an alternative signal which is issued at the same time, is also input to delay circuit 36. In the preferred embodiment, this contemporaneous signal is the most significant bit ("MSB") of the MATCH ADDRESS, and is connected to a first delay circuit 36a which is constructed in the same manner as delay circuit 36 described above. Note that a bit other than the MSB of the MATCH ADDRESS may be used and that the preferred selection is based on timing. Specifically, if all bits of the MATCH ADDRESS arrived at the same time, then any one of those bits could be used as the TC signal. However, typically the cells farthest from the word line driver arrive the latest to complete the MATCH ADDRESS. In this event, it is preferable to use the last arriving bit(s) of the MATCH ADDRESS since it is known that at that time the entire MATCH ADDRESS is valid. In addition, the complement of MSB is also available since MATCH ADDRESS is a dual rail signal, and therefore $\overline{\text{MSB}}$ is similarly connected to a delay circuit 36b, which also is constructed in the same manner as circuit 36 described above. In all events, both MSB and $\overline{\text{MSB}}$ provide a timing control signal, again denoted TC, which originally is issued at the same time as the signal to be compared (i.e., MATCH ADDRESS).

Turning now to the operation of system 98 and its analogies as compared to the Figures described above, note that the MATCH ADDRESS signal corresponds generally to the TAG signal described above, while the CAM ADDRESS signal corresponds to the ADDRESS. Further, as evident from above, the MSB of the MATCH ADDRESS is a timing control signal which corresponds to the valid bit of the cache system described above. Given the earlier lengthy operational description of FIGS. 2 through 8, the following sets forth in general the operation of system 98 with it understood that the reader may consult the above for a more thorough treatment of specific circuit details.

In general, the operation of FIG. 9 may be appreciated by substituting the corresponding signal names from FIG. 9 into those from the earlier discussions. For instance, returning briefly to the timing diagrams of FIG. 3a–e, the first entry pertaining to ADDRESS could be replaced by CAM ADDRESS, the second entry pertaining to TAG could be replaced by the MATCH ADDRESS, and the third entry pertaining to TC would be the same, with it understood that TC is the same as the MSB of the MATCH ADDRESS.

Given the above correlation of the FIG. 9 signals to the FIG. 2 signals, one skilled in the art will appreciate the related operation for system 98. For example, FIG. 3a also applies to system 98 to demonstrate an instance of a hit, but here the MATCH ADDRESS matches a CAM ADDRESS and, in response to the match, the SELECTED DATA is selected from CAM data memory word 102. Briefly revisiting the occurrences of FIG. 3a but applying those to system

98, at t1 a MATCH ADDRESS is received by system 98 and followed at t2 where CAM address word 100 outputs both the MATCH ADDRESS and $\overline{\text{MATCH ADDRESS}}$ signals; of course, since the MSBs of these complementary signals are used as the TC signals, then at t2 this timing control is also provided (i.e., either MSB or $\overline{\text{MSB}}$ rises). At t3, each delay circuit 36a and 36b outputs a respective delayed timing control signal $TC_D$ and $\overline{TC_D}$. These delayed signals, like $TC_D$ in the above discussion, slightly precede the time that the MATCH signal is output, and here MATCH is output by circuit 34 in response to a comparison of CAM ADDRESS and MATCH ADDRESS. The delayed timing control signals $TC_D$ and $\overline{TC_D}$, and the MATCH signal, are input to AND gate 38. Because in this instance both $TC_D$ and $\overline{TC_D}$ are received, the schematic of FIG. 4 is further modified to include a second n-channel transistor connected in parallel to n-channel transistor 48, where that second transistor is connected to receive the $\overline{TC_D}$ at its gate; thus, one of either n-channel transistor 48 or this additional transistor will conduct, and the remainder of logic AND gate 38 will operate as described above. Lastly, in response to a match, dynamic logic select circuit 40 outputs the SELECTED DATA as that data is brought from CAM data memory word 102. Having described FIG. 3a, FIGS. 3b–e are also easily understood by a person skilled in the art by substituting the correlating signals and reviewing the earlier discussion in the context of system 28 of FIG. 2. Thus, these details need not be set forth once again.

Given the additional appreciation of FIG. 9, one skilled in the art will recognize that the present embodiments may apply to a cache tag system, a CAM system, or other circuits operable to compare a first binary quantity (e.g., ADDRESS or CAM ADDRESS) with a second binary quantity (e.g., TAG or MATCH ADDRESS), and which is timed by a delay signal which is derived from the second binary quantity. Thus, given the additional variations and features set forth above, one skilled in the art may appreciate various scenarios in which the present embodiments may be employed.

Figure 10:
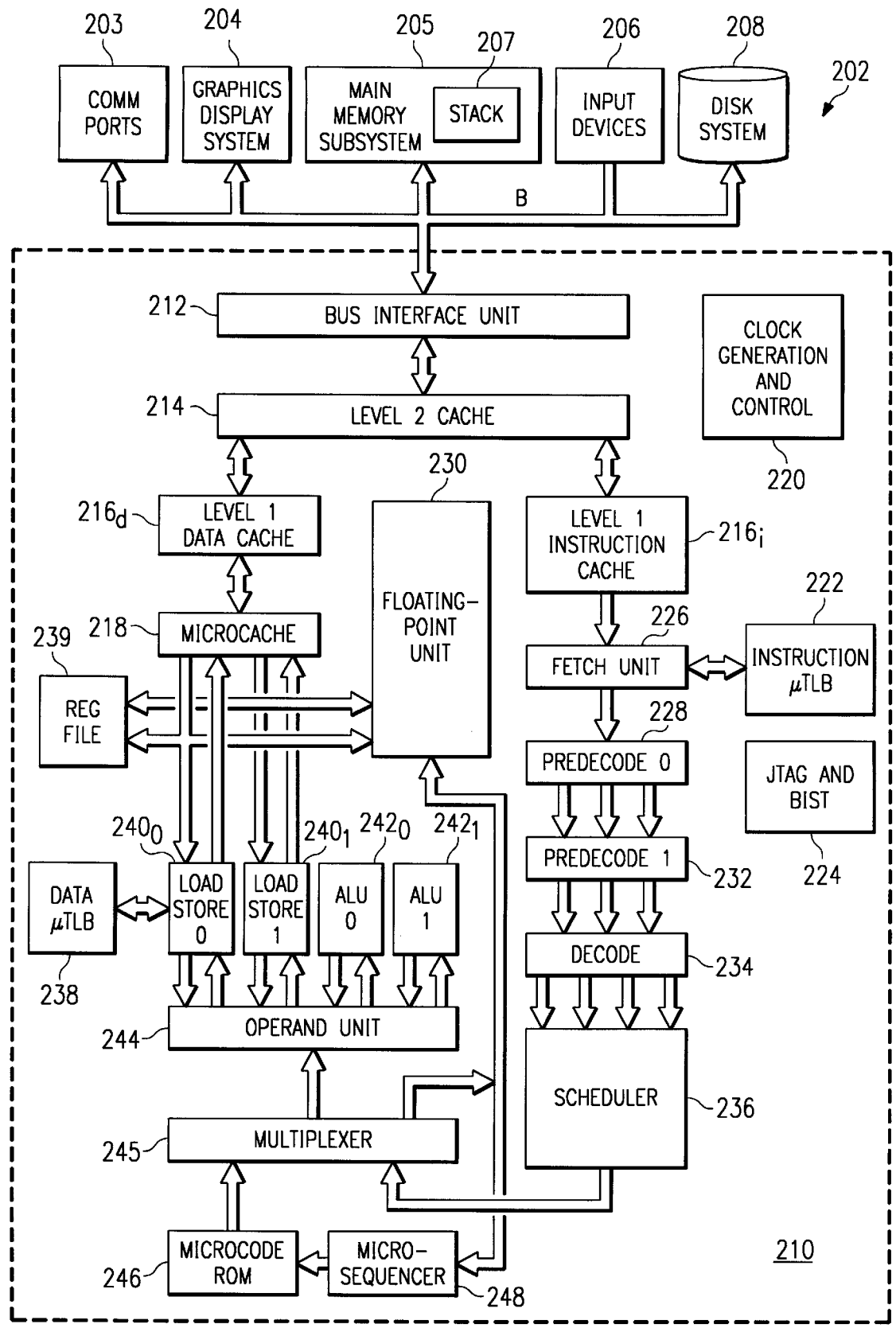
FIG. 10 illustrates an exemplary data processing system within which the preferred embodiments may be implemented.

Having described the above embodiments, FIG. 10 illustrates a block diagram of a microprocessor embodiment into which the above embodiments may be incorporated. Referring now to FIG. 10, an exemplary data processing system 202, including an exemplary superscalar pipelined microprocessor 210 within which the preferred embodiment is implemented, will be described. It is to be understood that the architecture of system 202 and of microprocessor 210 is described herein by way of example only, as it is contemplated that the present embodiments may be utilized in microprocessors of various architectures. It is therefore contemplated that one of ordinary skill in the art, having reference to this specification, will be readily able to implement the present embodiments in such other microprocessor architectures.

Microprocessor 210, as shown in FIG. 10, is connected to other system devices by way of bus B. While bus B, in this example, is shown as a single bus, it is of course contemplated that bus B may represent multiple buses having different speeds and protocols, as is known in conventional computers utilizing the PCI local bus architecture; single bus B is illustrated here merely by way of example and for its simplicity. System 202 contains such conventional subsystems as communication ports 203 (including modem ports and modems, network interfaces, and the like), graphics display system 204 (including video memory, video processors, a graphics monitor), main memory system 205 which is typically implemented by way of dynamic random access memory (DRAM) and includes a stack 207, input devices 206 (including keyboard, a pointing device, and the interface circuitry therefor), and disk system 208 (which may include hard disk drives, floppy disk drives, and CD-ROM drives). It is therefore contemplated that system 202 of FIG. 10 corresponds to a conventional desktop computer or workstation, as are now common in the art. Of course, other system implementations of microprocessor 210 can also benefit from the present embodiments, as will be recognized by those of ordinary skill in the art.

Microprocessor 210 includes a bus interface unit ("BIU") 212 that is connected to bus B, and which controls and effects communication between microprocessor 210 and the other elements in system 202. BIU 212 includes the appropriate control and clock circuitry to perform this function, including write buffers for increasing the speed of operation, and including timing circuitry so as to synchronize the results of internal microprocessor operation with bus B timing constraints. Microprocessor 210 also includes clock generation and control circuitry 220 which, in this exemplary microprocessor 210, generates internal clock phases based upon the bus clock from bus B; the frequency of the internal clock phases, in this example, may be selectably programmed as a multiple of the to frequency of the bus clock.

As is evident in FIG. 10, microprocessor 210 has three levels of internal cache memory, with the highest of these as level 2 cache 214, which is connected to BIU 212. In this example, level 2 cache 214 is a unified cache, and is configured to receive all cacheable data and cacheable instructions from bus B via BIU 212, such that much of the bus traffic presented by microprocessor 210 is accomplished via level 2 cache 214. Of course, microprocessor 210 may also effect bus traffic around cache 214, by treating certain bus reads and writes as "not cacheable". Level 2 cache 214, as shown in FIG. 10, is connected to two level 1 caches 216; level 1 data cache $216_d$ is dedicated to data, while level 1 instruction cache $216_i$ is dedicated to instructions. Power consumption by microprocessor 210 is minimized by only accessing level 2 cache 214 only in the event of cache misses of the appropriate one of the level 1 caches 216. Furthermore, on the data side, microcache 218 is provided as a level 0 cache, which in this example is a fully dual-ported cache.

As shown in FIG. 10 and as noted hereinabove, microprocessor 210 is of the superscalar type. In this example multiple execution units are provided within microprocessor 210, allowing up to four instructions to be simultaneously executed in parallel for a single instruction pointer entry. These execution units include two ALUs $244_0$, $244_2$ for processing conditional branch, integer, and logical operations, floating-point unit (FPU) 230, two load-store units $240_0$, $240_1$, and microsequencer 248. The two load-store units 240 utilize the two ports to microcache 218, for true parallel access thereto, and also perform load and store operations to registers in register file 239. Data microtranslation lookaside buffer ($\mu$TLB) 238 is provided to translate logical data addresses into physical addresses, in the conventional manner.

These multiple execution units are controlled by way of multiple pipelines with seven stages each, with write back. The pipeline stages are as follows:

F Fetch: This stage generates the instruction address and reads the instruction from the instruction cache or memory PD0 Predecode stage 0: This stage determines the length and starting position of up to three fetched x86-type instructions PD1 Predecode stage 1: This stage extracts the x86 instruction bytes and recodes them into fixed length format for decode DC Decode: This stage translates the x86 instructions into atomic operations (AOps)

SC Schedule: This stage assigns up to four AOps to the appropriate execution units OP Operand: This stage retrieves the register operands indicated by the AOps EX Execute: This stage runs the execution units according to the AOps and the retrieved operands WB Write back: This stage stores the results of the execution in registers or in memory Referring back to FIG. 10, the pipeline stages noted above are performed by various functional blocks within microprocessor 210. Fetch unit 226 generates instruction addresses from the instruction pointer, by way of instruction micro-translation lookaside buffer ($\mu$TLB) 222, which translates the logical instruction address to a physical address in the conventional way, for application to level 1 instruction cache $216_i$. Instruction cache $216_i$ produces a stream of instruction data to fetch unit 226, which in turn provides the instruction code to the predecode stages in the desired sequence. Speculative execution is primarily controlled by fetch unit 226, in a manner to be described in further detail hereinbelow.

Predecoding of the instructions is broken into two parts in microprocessor 210, namely predecode 0 stage 228 and predecode 1 stage 232. These two stages operate as separate pipeline stages, and together operate to locate up to three x86 instructions and apply the same to decoder 234. As such, the predecode stage of the pipeline in microprocessor 210 is three instructions wide. Predecode 0 unit 228, as noted above, determines the size and position of as many as three x86 instructions (which, of course, are variable length), and as such consists of three instruction recognizers; predecode 1 unit 232 recodes the multi-byte instructions into a fixed-length format, to facilitate decoding.

Decode unit 234, in this example, contains four instruction decoders, each capable of receiving a fixed length x86 instruction from predecode 1 unit 232 and producing from one to three atomic operations (AOps); AOps are substantially equivalent to RISC instructions. Three of the four decoders operate in parallel, placing up to nine AOps into the decode queue at the output of decode unit 234 to await scheduling; the fourth decoder is reserved for special cases. Scheduler 236 reads up to four AOps from the decode queue at the output of decode unit 234, and assigns these AOps to the appropriate execution units. In addition, the operand unit 244 receives and prepares the operands for execution, As indicated in FIG. 10, operand unit 244 receives an input from scheduler 236 and also from microcode ROM 248, via multiplexer 245, and fetches register operands for use in the execution of the instructions. In addition, according to this example, operand unit 244 performs operand forwarding to send results to registers that are ready to be stored, and also performs address generation for AOps of the load and store type.

Microsequencer 248, in combination with microcode ROM 246, control ALUs 242 and load/store units 240 in the execution of microcode entry AOps, which are generally the last AOps to execute in a cycle. In this example, microsequencer 248 sequences through microinstructions stored in microcode ROM 246 to effect this control for those microcoded microinstructions. Examples of microcoded microinstructions include, for microprocessor 210, complex or rarely-used x86 instructions, x86 instructions that modify segment or control registers, handling of exceptions and interrupts, and multi-cycle instructions (such as REP instructions, and instructions that PUSH and POP all registers).

Microprocessor 210 also includes circuitry 224 for controlling the operation of JTAG scan testing, and of certain built-in self-test functions, ensuring the validity of the operation of microprocessor 210 upon completion of manufacturing, and upon resets and other events.

Given the description of FIG. 10, as well as the descriptions above such as those relating to the prior Figures, one skilled in the art may appreciate that system 28 of FIG. 2 or system 98 of FIG. 9, and the circuit embodiments to accomplish the descriptions accompanying those Figures may be incorporated in connection with various components shown in those FIG. 10. For example, each of the various caches (e.g., 114, 116, and 118) could be accomplished using a system such as system 28.

From the above, one skilled in art may appreciate various benefits of the present embodiments. Generally, a microprocessor in accordance with the various embodiments may quickly and efficiently access one or more cache structures. As a more specific example, the capacitive load on the output of the circuit of FIG. 5 is reduced over the prior art and, therefore, various devices therein may be smaller thereby improving manufacturability and improving speed. As another example, the circuit of FIG. 4 provides an enabling transition based on a cache hit following a cache miss, thereby enabling faster types of dynamic logic, such as that shown in FIG. 8, to be used to select data when a cache hit occurs. Indeed, these benefits and examples serve further to demonstrate that while the present embodiments have been described in detail, various substitutions, modifications or alterations could be made to the descriptions set forth above without departing from the inventive scope. Numerous examples have been cited above. In addition to those examples, certain transistor types may be changed or replaced with alternative devices. As another example, the states of the bits stated above are in certain instances only by way of example and, therefore, changing those states may necessitate alternative logic structures. As yet another example, while FIG. 8 and its discussion depict a preferred dynamic logic select circuit, other dynamic logic gates could be used which discharge in response to a hit. As still another example, while the microprocessor system of FIG. 10 will benefit from the systems described in FIGS. 2 through 9, other microprocessor systems will benefit as well. Still other alternatives will be ascertainable by a person skilled in the art, and all of the above demonstrates the flexibility of the inventive scope which is defined by the following claims.

What is claimed is:

1. A comparison circuit for selecting data in response to a first binary quantity and a second binary quantity, said circuit comprising:

a match circuit for outputting a match signal in response to comparing the first binary quantity to the second binary quantity;

a delay circuit for outputting a delay signal in response to a signal generated at a same time as the second binary quantity;

circuitry for outputting a hit signal in response to the match signal and the delay signal, wherein the hit signal indicates a memory stores data corresponding to the second binary quantity;

dynamic select circuit for selectively outputting a logic state of data corresponding to the first binary quantity and in response to the hit signal, wherein said dynamic select circuit comprises a precharge node and at least one transistor coupled in a discharge path coupled to said precharge node, wherein said at least one transistor is operable to conduct in response to the hit signal reaching a discharge enable voltage such that said precharge node is discharged and the logic state of data changes in response thereto;

wherein the hit signal is initially at a disable level insufficient to discharge said precharge node;

wherein the hit signal transitions from the disable level to the discharge enable voltage in response to said memory storing data corresponding to the second binary quantity; and wherein a transition of the delay signal occurs at a time with respect to a transition of the match signal such that the hit signal does not reach the discharge enable voltage of said dynamic select circuit in response to said memory not storing data corresponding to the second binary quantity.

2. The comparison circuit of claim 1:

wherein said circuitry for outputting a hit signal comprises a logic AND gate;

wherein said logic AND gate has a precharged node; and wherein the hit signal is complementary of a signal at said precharged node.

3. The comparison circuit of claim 2:

wherein said logic AND gate has a first input for receiving the match signal;

wherein said logic AND gate has a second input connected to a gate of an n-channel transistor and for receiving the delay signal; and wherein said precharged node is discharged in response to a selective combination of the delay signal and the match signal.

4. The comparison circuit of claim 3:

and further comprising a tag memory operable to output a tag address as the second binary quantity;

wherein said tag memory is further operable to output a valid bit; and wherein the delay signal in response to a signal generated at a same time as the second binary quantity comprises the valid bit output from said tag memory at a same time as the tag address.

5. The comparison circuit of claim 3:

and further comprising a bus for providing a match address as the second binary quantity;

wherein the delay signal in response to a signal generated at a same time as the second binary quantity comprises a latest arriving bit of the match address.

6. The comparison circuit of claim 1 wherein said circuitry for outputting a hit signal comprises circuitry for initially precharging the hit signal to the disable level.

7. The comparison circuit of claim 1:

wherein said dynamic select circuit further comprises an input coupled to receive the hit signal;

wherein said at least one transistor comprises a first n-channel transistor having a gate connected to the input coupled to receive the hit signal and providing a conductive path along said discharge path;

wherein said discharge path further comprises a second n-channel transistor having a gate connected to an input coupled to receive selectable data and providing a conductive path along said discharge path;

wherein said first and second n-channel transistors are connected to discharge said precharge node when both of said first and second n-channel transistors are conducting; and wherein said select circuit outputs a selected data signal in response to a voltage level at said precharge node.

8. The comparison circuit of claim 1 wherein said match circuit comprises circuitry for precharging the match signal to an enable level.

9. The comparison circuit of claim 1:

wherein said match circuit comprises circuitry for precharging the match signal to an enable level; and wherein said match circuit comprises a plurality of bit comparison circuits, wherein each of said plurality of bit comparison circuits is coupled to discharge the precharged match signal in response to determining that a first input to said bit comparison circuit does not match a second input to said bit comparison circuit.

10. The comparison circuit of claim 9 wherein said first input to said bit comparison circuit is from the first binary quantity and wherein said second input to said bit comparison circuit is from the second binary quantity.

11. The comparison circuit of claim 10 wherein the first binary quantity comprises an input address and wherein the second binary quantity comprises a cache tag address to be compared to the first input address.

12. The comparison circuit of claim 10 wherein the first binary quantity comprises an address output from a content addressable memory and wherein the second binary quantity comprises a match address to be compared to the address output from a content addressable memory.

13. The comparison circuit of claim 1 wherein said delay circuit comprises circuitry for precharging the delay signal to a disable level.

14. The comparison circuit of claim 1:

wherein said match circuit comprises circuitry for precharging the match signal to an enable level; and wherein said delay circuit comprises circuitry for precharging the delay signal to a disable level.

15. The comparison circuit of claim 14:

wherein said circuitry for outputting a hit signal comprises a logic AND gate;

wherein said logic AND gate has a precharged node;

wherein the hit signal is complementary of a signal at said precharged node;

wherein said logic AND gate has a first input for receiving the match signal;

wherein said logic AND gate has a second input connected to a gate of an n-channel transistor and for receiving the delay signal; and wherein said precharged node is discharged in response to a selective combination of the delay signal and the match signal.

16. The comparison circuit of claim 15:

wherein the match signal drives a gate of a p-channel transistor and a gate of an n-channel transistor of said AND gate.

17. The comparison circuit of claim 1 where the transition of the delay signal occurs at approximately a same time as the transition of the match signal.

18. The comparison circuit of claim 1 where the transition of the delay signal occurs no earlier than slightly before a transition of the match signal.

19. The comparison circuit of claim 1 wherein the first binary quantity comprises in input address and wherein the second binary quantity comprises a cache tag address to be compared to the first input address.

20. The comparison circuit of claim 1 wherein the first binary quantity comprises an address output from a content addressable memory and wherein the second binary quantity comprises a match address to be compared to the address output from a content addressable memory.

21. The comparison circuit of claim 1:

and further comprising a tag memory operable to output a tag address as the second binary quantity;

wherein said tag memory is further operable to output a valid bit; and wherein the delay signal in response to a signal generated at a same time as the second binary quantity comprises the valid bit output from said tag memory at a same time as the tag address.

22. The comparison circuit of claim 1:

and further comprising a bus for providing a match address as the second binary quantity; and wherein the delay signal in response to a signal generated at a same time as the second binary quantity comprises a latest arriving bit of the match address.

23. The comparison circuit of claim 1 wherein the second binary quantity comprises a dual rail signal.

24. The comparison circuit of claim 1:

wherein said match circuit comprises a plurality of bit comparison circuits, wherein each of said plurality of bit comparison circuits is coupled to output a discharge signal to discharge the precharged match signal in response to determining that a first input to said bit comparison circuit does not match a second input to said bit comparison circuit;

wherein each of said plurality of bit comparison circuits has a structural delay between said first and second inputs and the discharge signal;

wherein said delay circuit has a structural delay between said signal generated at a same time as the second binary quantity and the delay signal; and wherein said structural delay of said bit comparison circuit matches said structural delay of said delay circuit.

25. A comparison circuit for selecting data in response to a first binary quantity and a second binary quantity, said circuit comprising:

a match circuit for outputting a match signal in response to comparing the first binary quantity to the second binary quantity, wherein the second binary quantity comprises a dual rail signal;

a delay circuit for outputting a delay signal in response to a signal generated at a same time as the second binary quantity;

circuitry for outputting a hit signal in response to the match signal and the delay signal, wherein the hit signal indicates a memory stores data corresponding to the second binary quantity;

dynamic select circuit for selectively outputting a logic state of data corresponding to the first binary quantity and in response to the hit signal, wherein said dynamic select circuit comprises a precharge node and at least one transistor coupled in a discharge path coupled to said precharge node, wherein said at least one transistor is operable to conduct in response to the hit signal reaching a discharge enable voltage such that said precharge node is discharged and the logic state of data changes in response thereto;

wherein the hit signal is initially at a disable level insufficient to discharge said precharge node;

wherein the hit signal transitions from the disable level to the discharge enable voltage in response to said memory storing data corresponding to the second binary quantity; and where the transition of the delay signal occurs no earlier than slightly before a transition of the match signal such that the hit signal does not reach the discharge enable voltage of said dynamic select circuit in response to said memory not storing data corresponding to the second binary quantity.

26. The comparison circuit of claim 25:

wherein said match circuit comprises circuitry for precharging the match signal to an enable level; and wherein said delay circuit comprises circuitry for precharging the delay signal to a disable level.

27. The comparison circuit of claim 25:

wherein said circuitry for outputting a hit signal comprises a logic AND gate;

wherein said logic AND gate has a precharged node;

wherein the hit signal is complementary of a signal at said precharged node;

wherein said logic AND gate has a first input for receiving the match signal;

wherein said logic AND gate has a second input connected to a gate of an n-channel transistor and for receiving the delay signal; and wherein said precharged node is discharged in response to a selective combination of the delay signal and the match signal.

28. The comparison circuit of claim 25:

and further comprising a tag memory operable to output a tag address as the second binary quantity;

wherein said tag memory is further operable to output a valid bit; and wherein the delay signal in response to a signal generated at a same time as the second binary quantity comprises the valid bit output from said tag memory at a same time as the tag address.

29. The comparison circuit of claim 25:

and further comprising a bus for providing a match address as the second binary quantity;

wherein the delay signal in response to a signal generated at a same time as the second binary quantity comprises a latest arriving bit of the match address.

30. The comparison circuit of claim 25 wherein the first binary quantity comprises an input address and wherein the second binary quantity comprises a cache tag address to the compared to the first input address.

31. The comparison circuit of claim 25 wherein the first binary quantity comprises an address output from a content addressable memory and wherein the second binary quantity comprises a match address to be compared to the address output from a content addressable memory.

32. The comparison circuit of claim 25:

and further comprising a tag memory operable to output a tag address as the second binary quantity;

wherein said tag memory is further operable to output a valid bit; and wherein the delay signal in response to a signal generated at a same time as the second binary quantity comprises the valid bit output from said tag memory at a same time as the tag address.

33. The comparison circuit of claim 25:
and further comprising a bus for providing a match address as the second binary quantity; and
wherein the delay signal in response to a signal generated at a same time as the second binary quantity comprises a latest arriving bit of the match address.

34. A microprocessor-based computer system, comprising:
an input device;
an output system; and
a microprocessor, coupled to the input device and the output system, said microprocessor comprising a comparison circuit for selecting data in response to a first binary quantity and a second binary quantity, said comparison circuit comprising:
a match circuit for outputting a match signal in response to comparing the first binary quantity to the second binary quantity;
a delay circuit for outputting a delay signal in response to a signal generated at the same time as the second binary quantity;
circuitry for outputting a hit signal in response to the match signal and the delay signal, wherein the hit signal indicates a memory stores data corresponding to the second binary quantity;
dynamic select circuit for selectively outputting a logic state of data corresponding to the first binary quantity and in response to the hit signal, wherein said dynamic select circuit comprises a precharge node and at least one transistor coupled in a discharge path coupled to said precharge node, wherein said at least one transistor is operable to conduct in response to the hit signal reaching a discharge enable voltage such that said precharge node is discharged and the logic state of data changes in response thereto;
wherein the hit signal is initially at a disable level insufficient to discharge said precharge node;
wherein the hit signal transitions from the disable level to the discharge enable voltage in response to said memory storing data corresponding to the second binary quantity; and
wherein a transition of the delay signal occurs at a time with respect to a transition of the match signal such that the hit signal does not reach the discharge enable voltage of said dynamic select circuit in response to said memory not storing data corresponding to the second binary quantity.

35. The system of claim 34:
wherein said circuitry for outputting a hit signal comprises a logic AND gate;
wherein sail logic AND gate has a precharged node; and
wherein the hit signal is complementary of a signal at said precharged node.

36. The system of claim 35:
wherein said logic AND gate has a first input for receiving the match signal;
wherein said logic AND gate has a second input connected to a gate of an n-channel transistor and for receiving the delay signal; and
wherein said precharged node is discharged in response to a selective combination of the delay signal and the match signal.

37. The system of claim 36:
and further comprising a tag memory operable to output a tag address as the second binary quantity;
wherein said tag memory is further operable to output a valid bit; and
wherein the delay signal in response to a signal generated at a same time as the second binary quantity comprises the valid bit output from said tag memory at a same time as the tag address.

38. The system of claim 36:
and further comprising a bus for providing a match address as the second binary quantity;
wherein the delay signal in response to a signal generated at a same time as the second binary quantity comprises a latest arriving bit of the match address.

39. The system of claim 34 wherein said circuitry for outputting a hit signal comprises circuitry for initially precharging the hit signal to the disable level.

40. The system of claim 34:
wherein said dynamic select circuit further comprises an input coupled to receive the hit signal;
wherein said at least one transistor comprises a first n-channel transistor having a gate connected to the input coupled to receive the hit signal and providing a conductive path along said discharge path;
wherein said discharge path further comprises a second n-channel transistor having a gate connected to an input coupled to receive selectable data and providing a conductive path along said discharge path;
wherein said first and second n-channel transistors are connected to discharge said precharge node when both of said first and second n-channel transistors are conducting; and
wherein said select circuit outputs a selected data signal in response to a voltage level at said precharge node.

41. The system of claim 34 wherein said match circuit comprises circuitry for precharging the match signal to an enable level.

42. The system of claim 34:
wherein said match circuit comprises circuitry for precharging the match signal to an enable level; and
wherein said match circuit comprises a plurality of bit comparison circuits, wherein each of said plurality of bit comparison circuits is coupled to discharge the precharged match signal in response to determining that a first input to said bit comparison circuit does not match a second input to said bit comparison circuit.

43. The system of claim 42 wherein said first input to said bit comparison circuit is from the first binary quantity and wherein said second input to said bit comparison circuit is from the second binary quantity.

44. The system of claim 43 wherein the first binary quantity comprises an input address and wherein the second binary quantity comprises a cache tag address to be compared to the first input address.

45. The system of claim 43 wherein the first binary quantity comprises an address output from a content addressable memory and wherein the second binary quantity comprises a match address to be compared to the address output from a content addressable memory.

46. The system of claim 34 wherein said delay circuit comprises circuitry for precharging the delay signal to a disable level.

47. The system of claim 34:
wherein said match circuit comprises circuitry for precharging the match signal to an enable level; and wherein said delay circuit comprises circuitry for precharging the delay signal to a disable level.

48. The system of claim 47:

wherein said circuitry for outputting a hit signal comprises a logic AND gate;

wherein said logic AND gate has a precharged node;

wherein the hit signal is complementary of a signal at said precharged node;

wherein said logic AND gate has a first input for receiving the match signal;

wherein said logic AND gate has a second input connected to a gate of an n-channel transistor and for receiving the delay signal; and wherein said precharged node is discharged in response to a selective combination of the delay signal and the match signal.

49. The system of claim 48:

wherein the match signal drives a gate of a p-channel transistor and a gate of an n-channel transistor of said AND gate.

50. The system of claim 34 where the transition of the delay signal occurs at approximately a same time as the transition of the match signal.

51. The system of claim 34 where the transition of the delay signal occurs no earlier than slightly before a transition of the match signal.

52. The system of claim 34 wherein the first binary quantity comprises an input address and wherein the second binary quantity comprises a cache tag address to be compared to the first input address.

53. The system of claim 34 wherein the first binary quantity comprises an address output from a content addressable memory and wherein the second binary quantity comprises a match address to be compared to the address output from a content addressable memory.

54. The system of claim 34:

and further comprising a tag memory operable to output a tag address as the second binary quantity;

wherein said tag memory is further operable to output a valid bit; and wherein the delay signal in response to a signal generated at a same time as the second binary quantity comprises the valid bit output from said tag memory at a same time as the tag address.

55. The system of claim 34:

and further comprising a bus for providing a match address as the second binary quantity; and wherein the delay signal in response to a signal generated at a same time as the second binary quantity comprises a latest arriving bit of the match address.

56. The system of claim 34 wherein the second binary quantity comprises a dual rail signal.

57. The system of claim 34:

wherein said match circuit comprises a plurality of bit comparison circuits, wherein each of said plurality of bit comparison circuits is coupled to output a discharge signal to discharge the precharged match signal in response to determining that a first input to said bit comparison circuit does not match a second input to said bit comparison circuit;

wherein each of said plurality of bit comparison circuits has a structural delay between said first and second inputs and the discharge signal;

wherein said delay circuit has a structural delay between said signal generated at a same time as the second binary quantity and the delay signal; and wherein said structural delay of said bit comparison circuit matches said structural delay of said delay circuit.

* * * * *

UNITED STATES PATENT AND TRADEMARK OFFICE
CERTIFICATE OF CORRECTION

PATENT NO. : 5,905,680
DATED : 5/18/99
INVENTOR(S) : Patrick W. Bosshart

It is certified that error appears in the above-identified patent and that said Letters Patent is hereby corrected as shown below:

Cover Page, insert Item [60] under Related U.S. Application Data

--Provisional Application No. 60/016,803  April 30, 1996.--

Signed and Sealed this

Eighth Day of May, 2001

*Attest:*

NICHOLAS P. GODICI

*Attesting Officer*      *Acting Director of the United States Patent and Trademark Office*